United States Patent
Zavila

(10) Patent No.: US 10,146,427 B2
(45) Date of Patent: Dec. 4, 2018

(54) CURVE-FITTING APPROACH TO HIGH DEFINITION TOUCH PAD (HDTP) PARAMETER EXTRACTION

(75) Inventor: Vadim Zavila, Freemont, CA (US)

(73) Assignee: NRI R&D PATENT LICENSING, LLC, San Antonio, TX (US)

( * ) Notice: Subject to any disclaimer, the term of this patent is extended or adjusted under 35 U.S.C. 154(b) by 0 days.

(21) Appl. No.: 13/038,372

(22) Filed: Mar. 1, 2011

(65) Prior Publication Data
US 2011/0210943 A1  Sep. 1, 2011

Related U.S. Application Data

(60) Provisional application No. 61/309,424, filed on Mar. 1, 2010.

(51) Int. Cl.
*G06F 3/0488* (2013.01)
*G06F 3/041* (2006.01)
*G06F 3/042* (2006.01)
*G06F 3/044* (2006.01)

(52) U.S. Cl.
CPC ......... *G06F 3/04883* (2013.01); *G06F 3/042* (2013.01); *G06F 3/044* (2013.01); *G06F 3/0414* (2013.01); *G06F 3/0416* (2013.01)

(58) Field of Classification Search
CPC ...................................... G06F 3/044
USPC .................. 345/173–178; 715/863
See application file for complete search history.

(56) References Cited

U.S. PATENT DOCUMENTS

| | | |
|---|---|---|
| 1,947,020 A | 2/1934 | Ranger |
| 3,493,669 A | 2/1970 | Elbrecht et al. |
| 3,591,699 A | 7/1971 | Cutler |
| 3,612,741 A | 10/1971 | Marshall |
| 3,651,242 A | 3/1972 | Evans |
| 3,730,046 A | 5/1973 | Spence |
| 3,742,133 A | 6/1973 | O'Sullivan |
| 3,805,091 A | 4/1974 | Colin |
| 3,813,473 A | 5/1974 | Terymenko |
| 3,878,748 A | 4/1975 | Spence |
| 3,956,959 A | 5/1976 | Ebihara et al. |

(Continued)

FOREIGN PATENT DOCUMENTS

EP  0 574 213 A1  12/1993

OTHER PUBLICATIONS

Moog, Robert A. The Human Finger—A Versatile Electronic Music Instrument Component, Audio Engineering Society Preprint, 1977, New York, NY, USA.

(Continued)

*Primary Examiner* — Chun-Nan Lin
(74) *Attorney, Agent, or Firm* — Procopio, Cory Hargreaves & Savitch, LLP

(57) ABSTRACT

Systems and methods for implementing a touch user interface using at least one at least one edge detection algorithm to produce edge data that is in turn provided to at least one curve-fitting algorithm to produce curve parameter data. The curve parameter data in turn provided to at least one calculation algorithm to produce interpreted data, wherein the interpreted data comprises user interface information responsive to the human touch made by the user to the touch surface. In various implementations the touch sensor can include a capacitive matrix, pressure sensor array, LED array, arrays of on-off contact sensors, or a video camera.

20 Claims, 23 Drawing Sheets

(56) References Cited

U.S. PATENT DOCUMENTS

| | | |
|---|---|---|
| 3,962,945 A | 6/1976 | Creager et al. |
| 4,075,921 A | 2/1978 | Heet |
| 4,080,867 A | 3/1978 | Ratanangsu |
| 4,117,413 A | 9/1978 | Moog |
| 4,122,742 A | 10/1978 | Deutsch |
| 4,151,368 A | 4/1979 | Fricke et al. |
| 4,182,213 A | 1/1980 | Iodice |
| 4,274,321 A | 6/1981 | Swartz |
| 4,318,327 A | 3/1982 | Toups |
| 4,365,533 A | 12/1982 | Clark, Jr. et al. |
| 4,748,676 A | 5/1988 | Miyagawa |
| 4,781,099 A | 11/1988 | Kolke |
| 4,794,838 A | 1/1989 | Corrigau, III |
| 4,797,608 A | 1/1989 | White |
| 4,852,444 A | 8/1989 | Hoover et al. |
| 4,899,137 A | 2/1990 | Behrens et al. |
| 4,991,488 A | 2/1991 | Fala et al. |
| 5,033,352 A | 7/1991 | Kellogg et al. |
| 5,045,687 A | 9/1991 | Gurney |
| 5,070,399 A | 12/1991 | Martel |
| 5,146,833 A | 9/1992 | Lui |
| 5,159,140 A | 10/1992 | Kimpara et al. |
| 5,218,160 A | 6/1993 | Grob-De Velga |
| 5,233,123 A | 8/1993 | Rose et al. |
| 5,237,647 A | 8/1993 | Roberts et al. |
| 5,262,585 A | 11/1993 | Greene et al. |
| 5,270,711 A | 12/1993 | Knapp |
| 5,281,754 A | 1/1994 | Farrett et al. |
| 5,292,999 A | 3/1994 | Tumura |
| 5,341,133 A | 8/1994 | Savoy et al. |
| 5,357,048 A | 10/1994 | Sgroi |
| 5,378,850 A | 1/1995 | Tumura |
| 5,386,219 A | 1/1995 | Greanias et al. |
| 5,420,936 A | 5/1995 | Fitzpatrick et al. |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,719,347 A | 2/1998 | Masubachi et al. |
| 5,719,561 A | 2/1998 | Gonzales |
| 5,741,993 A | 4/1998 | Kushimiya |
| 5,748,184 A | 5/1998 | Shieh |
| 5,786,540 A | 7/1998 | Westlund |
| 5,763,806 A | 8/1998 | Willis |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari et al. |
| 6,392,705 B1 | 5/2002 | Chaddha |
| 6,400,436 B1 | 6/2002 | Senior |
| 6,404,898 B1 | 6/2002 | Rhoads |
| 6,408,087 B1 | 6/2002 | Kramer |
| 6,570,078 B2 * | 5/2003 | Ludwig .................. 84/600 |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 * | 7/2009 | Ludwig .................. 345/163 |
| 7,598,949 B2 | 10/2009 | Han |
| 7,611,409 B2 | 11/2009 | Muir et al. |
| 8,154,529 B2 * | 4/2012 | Sleeman et al. .............. 345/173 |
| 8,169,414 B2 * | 5/2012 | Lim ..................... 345/173 |
| 8,170,346 B2 | 5/2012 | Ludwig |
| 8,179,376 B2 * | 5/2012 | Griffin .................. 345/173 |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2005/0140678 A1 * | 6/2005 | Gielis et al. .................. 345/441 |
| 2006/0177112 A1 * | 8/2006 | Yang et al. .................. 382/120 |
| 2006/0252530 A1 | 11/2006 | Oberberger et al. |
| 2007/0044019 A1 | 2/2007 | Moon |
| 2007/0063990 A1 * | 3/2007 | Park et al. .................. 345/173 |
| 2007/0229477 A1 | 10/2007 | Ludwig |
| 2008/0010616 A1 | 1/2008 | Algreatly |
| 2008/0143690 A1 * | 6/2008 | Jang et al. .................. 345/175 |
| 2008/0164076 A1 | 7/2008 | Orsley |
| 2008/0168403 A1 * | 7/2008 | Westerman et al. .......... 715/863 |
| 2008/0259053 A1 | 10/2008 | Newton |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 * | 7/2009 | Ronkainen .................. 345/173 |
| 2009/0254869 A1 * | 10/2009 | Ludwig et al. ............... 715/863 |
| 2010/0013860 A1 * | 1/2010 | Mandella et al. ............ 345/650 |
| 2010/0044121 A1 | 2/2010 | Graham et al. |
| 2010/0060607 A1 | 3/2010 | Ludwig |
| 2010/0079385 A1 * | 4/2010 | Holmgren et al. ........... 345/173 |
| 2010/0079405 A1 * | 4/2010 | Bernstein .................. 345/174 |
| 2010/0087241 A1 | 4/2010 | Nguyen et al. |
| 2010/0090963 A1 * | 4/2010 | Dubs et al. .................. 345/173 |
| 2010/0090983 A1 * | 4/2010 | Challener et al. ............. 345/175 |
| 2010/0110025 A1 | 5/2010 | Lim |
| 2010/0117978 A1 | 5/2010 | Shirado |
| 2010/0177118 A1 * | 7/2010 | Sytnikov et al. ............. 345/619 |
| 2010/0220066 A1 * | 9/2010 | Murphy .................. 345/173 |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 * | 12/2010 | Wilairat .................. 345/173 |
| 2010/0328032 A1 * | 12/2010 | Rofougaran ................ 340/5.82 |
| 2011/0007000 A1 | 1/2011 | Lim |
| 2011/0037735 A1 * | 2/2011 | Land et al. ................. 345/178 |
| 2011/0063251 A1 * | 3/2011 | Geaghan et al. ............. 345/174 |
| 2011/0086706 A1 | 4/2011 | Zalewski |
| 2011/0202889 A1 * | 8/2011 | Ludwig et al. ............... 715/856 |
| 2011/0202934 A1 * | 8/2011 | Ludwig .................. 719/328 |
| 2011/0260998 A1 | 10/2011 | Ludwig |
| 2011/0261049 A1 | 10/2011 | Cardno |
| 2011/0285648 A1 | 11/2011 | Simon et al. |
| 2012/0007821 A1 | 1/2012 | Zaliva |

(56) References Cited

U.S. PATENT DOCUMENTS

| | | | |
|---|---|---|---|
| 2012/0034978 A1 | 2/2012 | Lim | |
| 2012/0056846 A1* | 3/2012 | Zaliva | 345/174 |
| 2012/0194461 A1 | 4/2012 | Lim | |
| 2012/0108323 A1 | 5/2012 | Kelly et al. | |
| 2012/0192119 A1 | 7/2012 | Zaliva | |
| 2012/0194462 A1* | 8/2012 | Lim | 345/173 |
| 2012/0195522 A1 | 8/2012 | Ludwig | |
| 2012/0223903 A1* | 9/2012 | Ludwig | 345/173 |
| 2012/0235940 A1 | 9/2012 | Ludwig | |
| 2012/0262401 A1* | 10/2012 | Rofougaran | 345/173 |
| 2012/0280927 A1 | 11/2012 | Ludwig | |
| 2012/0280928 A1 | 11/2012 | Ludwig | |
| 2012/0317521 A1 | 12/2012 | Ludwig | |
| 2013/0009896 A1 | 1/2013 | Zaliva | |
| 2013/0038554 A1 | 2/2013 | West | |

OTHER PUBLICATIONS

Johnson, Colin "Image sensor tracks moving objects in hardware", Electronic Engineering Times, Apr. 5, 1999.
Kaoss pad dynamic effect/controller, Korg Proview Users' magazine Summer 1999.
Leiberman, David Touch screens extend grasp Into consumer realm Electronic Engineering Times, Feb. 8, 1999.
"Lim, Agrawal, and Nekludova ""A Fast Algorithm for Labelling Connected Components in Image Arrays"", Technical Report Series, No. NA86-2, Thinking Machines Corp., 1986 (rev. 1987),Cambridge, Mass., USA."
Pennywitt, Kirk "Robotic Tactile Sensing," Byte, Jan. 1986.
Review of KORG X-230 Drum (later called Wave Drum), Electronic Musician, Apr. 1994.
Rich, Robert "Buchla Lightning MIDI Controller", Electronic Musician, Oct. 1991.
Rich, Robert "Buchla Thunder", Electronic Musician, Aug. 1990.
Dario P. and Derossi D. "Tactile sensors and the gripping challenge," IEEE Spectrum, vol. 5, No. 22, pp. 46-52, Aug. 1985.
Snell, John M. "Sensors for Playing Computer Music with Expression", Proceedings of the Intl. Computer Music Conf. at Eastman, 1983.
Verner J. Artif Starr Switch Company Ztar 624-D, Electronic Musician, Nov. 1994.
Lippold Haken, "An Indiscrete Music Keyboard," Computer Music Journal, Spring 1998, pp. 30-48.
Moyle, Michael, et al. "A Flick in the Right Direction: A Case Study of Gestural Input." Conferences in Research and Practice in Information Technology, vol. 18, Jan. 2005; New Zealand.
Dulberg, Martin S., et al. "An Imprecise Mouse Gesture for the Fast Activation of Controls." IOS Press, Aug. 1999.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated Feb. 1, 2013 issued in U.S. Appl. No. 13/441,842, filed Apr. 7, 2012.
USPTO Notice of Allowance dated Feb. 22, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Hernandez-Leon, R., "Classifying using Specific Rules with High Confidence" IEEE Nov. 2010.
Fang, Yuguang, et al, "Dynamics of a Winner-Take-All Neural Network" Neural Networks vol. 9, No. 7, pp. 1141-1154, Oct. 1996.
USPTO Notice of Allowance dated Feb. 19, 2013 issued in U.S. Appl. No. 13/442,806, filed Apr. 9, 2012.
Moto, "DIY Touchscreen Analysis,"http://labs.moto.com/diy-touchscreen-analysis/, Jul. 15, 2010.
Wilson, Tracy, "How the iPhone Works," http://electronics.howstuffworks.com/iphone2.htm, Jan. 8, 2011.
Walker, Geoff, "Touch and the Apple iPhone," http://www.veritasetvisus.com/VVTP-12,%20Walker.pdf, Feb. 2007, viewed May 12, 2013.
Multi-Touch Sensing through LED Matrix Displays (video), "http://cs.nyu.edu/~jhan/ledtouch/index.html," Feb. 18, 2011.
"Roberts Cross," http://en.wikipedia.org/wiki/Roberts_Cross, Jul. 20, 2010, visited Feb. 28, 2011.
"Sobel Operator," http://en.wikipedia.org/wiki/Sobel_operator, Mar. 12, 2010, visited Feb. 28, 2011.
"Prewitt," http://en.wikipedia.org/wiki/Prewitt, Mar. 15, 2010, visited Feb. 28, 2011.
"Coefficient of variation," http://en.wikipedia.org/wiki/Coefficient_of_variation, Feb. 15, 2010, visited Feb. 28, 2011.
"Canny edge detector," http://en.wikipedia.org/wiki/Canny_edge_detector, Mar. 5, 2010, visited Feb. 28, 2011.
"Polynomial regression," http://en.wikipedia.org/wiki/Polynomial_regression, Jul. 24, 2010, visited Feb. 28, 2011.
Pilu,M., Fitzgibbon,A., Fisher, R., "Training PDMs on models: The Case of Deformable Superellipses," Proceedings of the 7th British Machine Vision Conference, Edinburgh, Scotland, 1996, pp. 373-382, https://docs.google.com/viewera=v&pid=explorer&chrome=true&srcid=0BxWzm3JBPnPmNDI1MDIxZGUtNGZhZi00NzJhLWFhZDMtNTJmYmRIMWYyMjBh&authkey=CPeVx4wO&hl=en, visited Feb. 28, 2011 and May 12, 2013.
Osian, M., Tuytelaars, T., Van Gool, L., Leuven, K, "Fitting Superellipses to Incomplete Contours," IEEE Computer Society Conference on Computer Vision and Pattern Recognition Workshops (CVPRW '04), Jun. 2004.
"Hough transform," http://en.wikipedia.org/wiki/Hough_transform, Feb. 13, 2010, visited Feb. 28, 2011.
"Tactile Pressure Measurement, Pressure Mapping Systems, and Force Sensors and Measurement Systems," http://www.tekscan.com, Feb. 3, 2011.
"Sensor Products LLC—Tactile Surface Pressure and Force Sensors," Oct. 26, 2006, http://www.sensorprod.com.
"Pressure Profile Systems," Jan. 29, 2011, http://www.pressureprofile.com.
"Xsensor Technology Corporation," Feb. 7, 2011, http://www.xsensor.com.
"Balda AG," Feb. 26, 2011, http://www.balda.de.
"Cypress Semiconductor," Feb. 28, 2011, http://www.cypress.com.
"Synaptics," Jan. 28, 2011, http://www.synaptics.com.

* cited by examiner

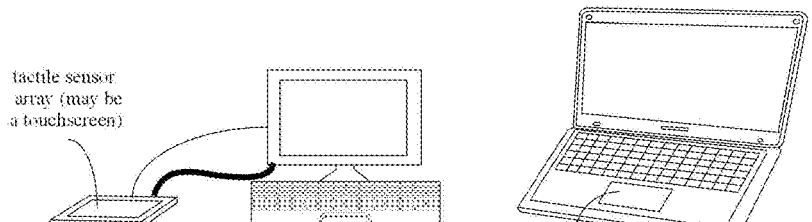
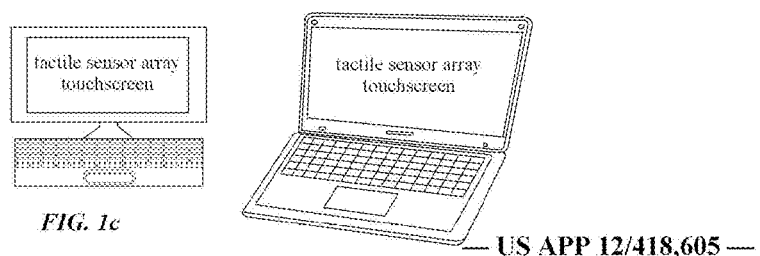
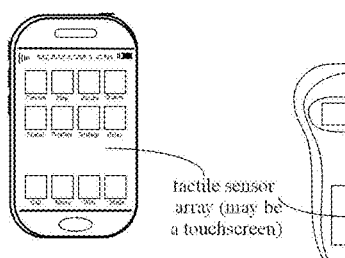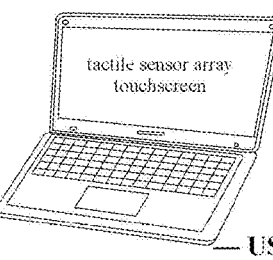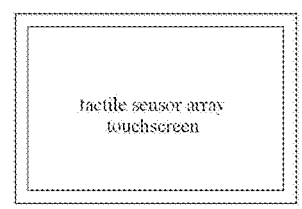
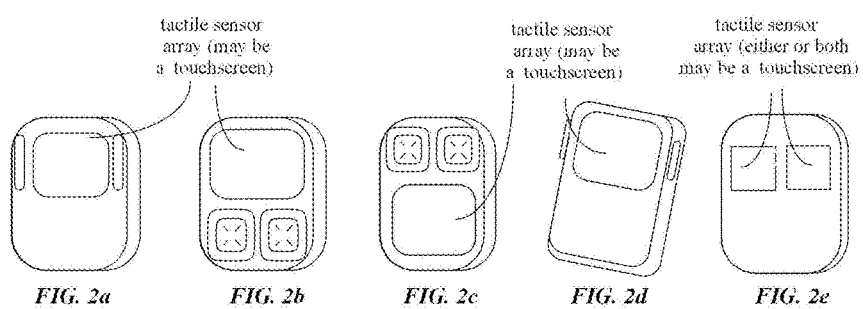

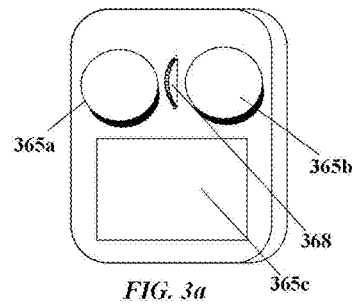
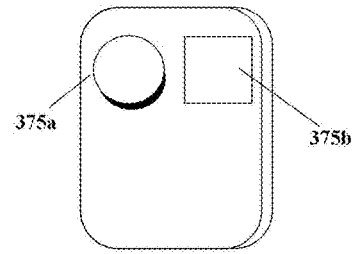
FIG. 3a  FIG. 3b
— US APP 12/418,605 —
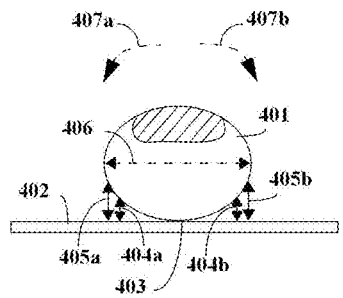
FIG. 4
— US APP 12/418,605 —
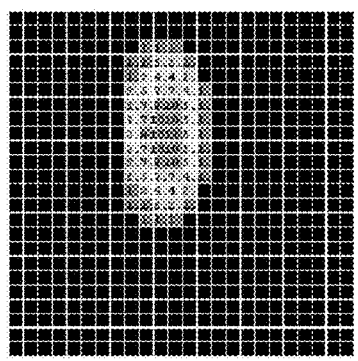
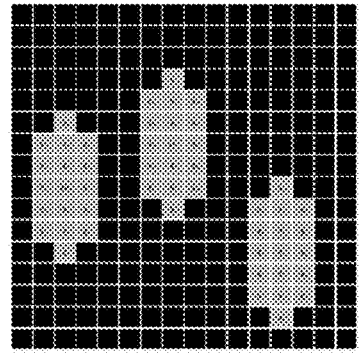
FIG. 5a  FIG. 5b

— PRIOR ART —

— PRIOR ART —

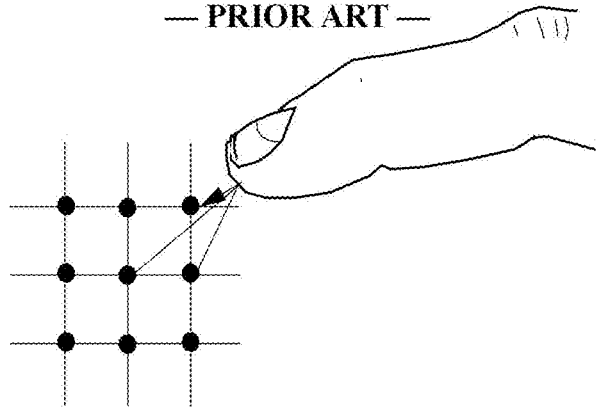
*FIG. 9*
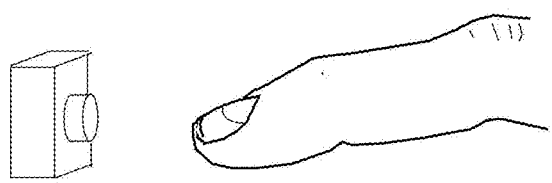
*FIG. 10a*
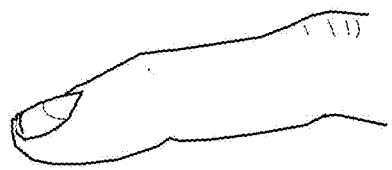
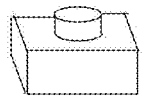
*FIG. 10b*
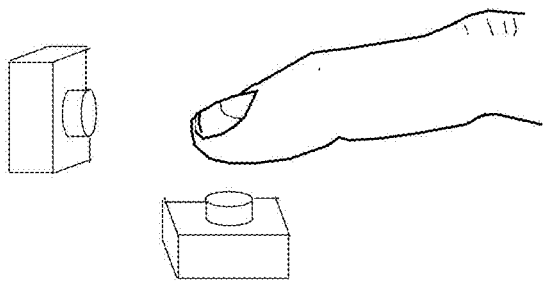
*FIG. 10c*

— PRIOR ART —

— PRIOR ART —

— PRIOR ART —

— PRIOR ART —

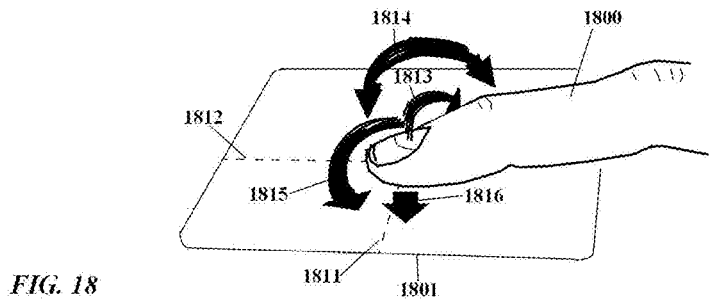
FIG. 18
— US PAT 6,570,078 —
— US APP 12/418,605 —
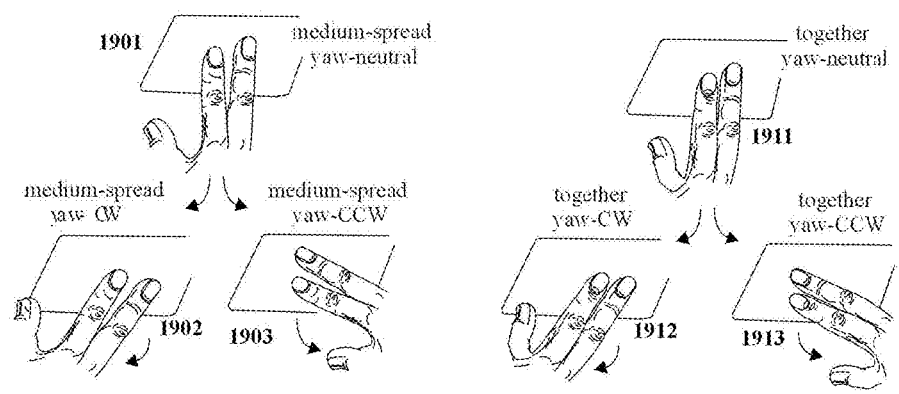
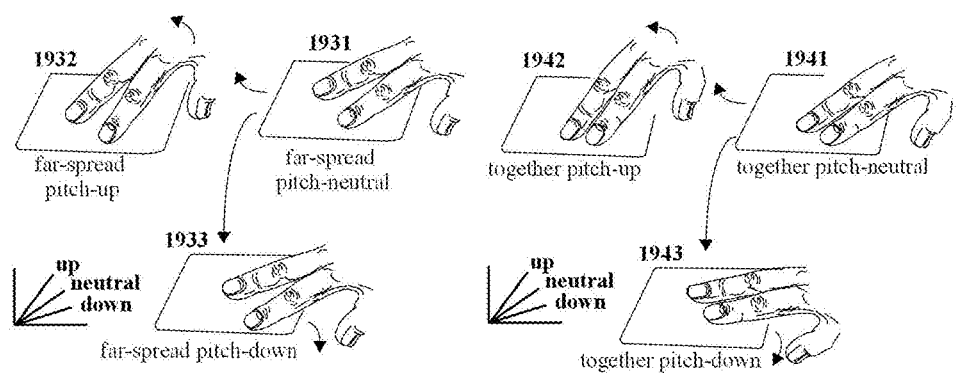
FIG. 19

— US PAT 6,570,078 —
— US APP 12/418,605 —

— US PAT 6,570,078 —
— US APP 12/6502,230 —
— US APP 13/026,097 —

CURVE-FITTING APPROACH TO HIGH DEFINITION TOUCH PAD (HDTP) PARAMETER EXTRACTION

CROSS-REFERENCE TO RELATED APPLICATIONS

Pursuant to 35 U.S.C. § 119(e), this application claims benefit of priority from Provisional U.S. Patent application Ser. No. 61/309,424, filed Mar. 1, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

The invention relates to user interfaces providing an additional number of simultaneously-adjustable interactively-controlled discrete (clicks, taps, discrete gestures) and pseudo-continuous (downward pressure, roll, pitch, yaw, multi-touch geometric measurements, continuous gestures, etc.) user-adjustable settings and parameters, and in particular to a curve-fitting approach to HDTP parameter extraction, and further how these can be used in applications.

By way of general introduction, touch screens implementing tactile sensor arrays have recently received tremendous attention with the addition multi-touch sensing, metaphors, and gestures. After an initial commercial appearance in the products of FingerWorks, such advanced touch screen technologies have received great commercial success from their defining role in the iPhone and subsequent adaptations in PDAs and other types of cell phones and hand-held devices. Despite this popular notoriety and the many associated patent filings, tactile array sensors implemented as transparent touchscreens were in fact taught in the 1999 filings of issued U.S. Pat. No. 6,570,078 and pending U.S. patent application Ser. No. 11/761,978.

Despite the many popular touch interfaces and gestures, there remains a wide range of additional control capabilities that can yet be provided by further enhanced user interface technologies. A number of enhanced touch user interface features are described in U.S. Pat. No. 6,570,078, pending U.S. patent applications Ser. No. 11/761,978, 12/418,605, 12/502,230, 12/541,948, and related pending U.S. patent applications. These patents and patent applications also address popular contemporary gesture and touch features. The enhanced user interface features taught in these patents and patent applications, together with popular contemporary gesture and touch features, can be rendered by the "High Definition Touch Pad" (HDTP) technology taught in those patents and patent applications. Implementations of HDTP provide advanced multi-touch capabilities far more sophisticated that those popularized by FingerWorks, Apple, NYU, Microsoft, Gesturetek, and others.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In another aspect of the invention, a method for a touch user interface includes implements a touch user interface by receiving tactile sensing data from a touch sensor disposed on a touch sensor and providing the tactile sensing data responsive to a human touch made by a user to the touch surface to at least one processor for performing calculations on the tactile sensing data, producing processed sensor data to provide to at least one at least one edge detection algorithm to produce edge data that is in turn provided to at least one curve-fitting algorithm to produce curve parameter data, the curve parameter data in turn provided to at least one calculation algorithm to produce interpreted data, wherein the interpreted data comprises user interface information responsive to the human touch.

In another aspect of the invention, a system for implementing a touch user interface includes a touch surface disposed on a touch sensor, the touch sensor providing tactile sensing data responsive to human touch made by a user to the touch surface, at least one processor for performing calculations on the tactile sensing data and for producing processed sensor data, producing processed sensor data to provide to at least one at least one edge detection algorithm to produce edge data that is in turn provided to at least one curve-fitting algorithm to produce curve parameter data, the curve parameter data in turn provided to at least one calculation algorithm to produce interpreted data, wherein the interpreted data comprises user interface information responsive to the human touch.

The touch sensor may have a capacitive matrix, a pressure sensor array, an LED array, or a video camera.

The edge detection algorithm can employing techniques such as those of Canny and its variants, numerical differential and related techniques of Roberts, Sobel, Prewitt, or other approaches.

The curve-fitting algorithm can include a polynomial regression, superellipse curve fit, generalized Hough transform, or other curve-fitting approaches.

The invention can produce at least one numerical quantity whose value is responsive to the touch-based gesture made by the user, for example a change in the roll angle of a finger.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIGS. 1a-1g depict a number of arrangements and embodiments employing the HDTP technology.

FIGS. 2a-2e and FIGS. 3a-3b depict various integrations of an HDTP into the back of a conventional computer mouse as taught in U.S. Pat. No. 7,557,797 and in pending U.S. patent application Ser. No. 12/619,678.

FIG. 4 illustrates the side view of a finger lightly touching the surface of a tactile sensor array.

FIG. 5a is a graphical representation of a tactile image produced by contact of a human finger on a tactile sensor array. FIG. 5b provides a graphical representation of a tactile image produced by contact with multiple human fingers on a tactile sensor array.

FIG. 9 depicts an implementation of a multiplexed LED array acting as a reflective optical proximity sensing array.

FIGS. 10a-10c depict camera implementations for direct viewing of at least portions of the human hand, wherein the camera image array is employed as an HDTP tactile sensor array.

FIG. 18 suggests general ways in which two or more of these independently adjustable degrees of freedom adjusted at once.

FIG. 19 demonstrates a few two-finger multi-touch postures or gestures from the many that can be readily recognized by HDTP technology.

DETAILED DESCRIPTION OF THE PREFERRED EMBODIMENTS

Figure 6:
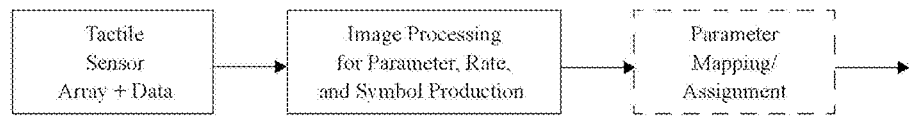
FIG. 6 depicts a signal flow in a HDTP implementation.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Despite the many popular touch interfaces and gestures in contemporary information appliances and computers, there remains a wide range of additional control capabilities that can yet be provided by further enhanced user interface technologies. A number of enhanced touch user interface features are described in U.S. Pat. No. 6,570,078, pending U.S. patent applications Ser. No. 11/761,978, 12/418,605, 12/502,230, 12/541,948, and related pending U.S. patent applications. These patents and patent applications also address popular contemporary gesture and touch features. The enhanced user interface features taught in these patents and patent applications, together with popular contemporary gesture and touch features, can be rendered by the "High Definition Touch Pad" (HDTP) technology taught in those patents and patent applications.

The present patent application addresses additional technologies for feature and performance improvements of HDTP technologies. Specifically, this patent application addresses a curve-fitting approach to HDTP parameter extraction.

Overview of HDTP User Interface Technology

Before providing details specific to the present invention, some embodiments of HDTP technology is provided. This will be followed by a summarizing overview of HDTP technology. With the exception of a few minor variations and examples, the material presented in this overview section is draw from U.S. Pat. No. 6,570,078, pending U.S. patent applications Ser. No. 11/761,978, 12/418,605, 12/502,230, 12/541,948, 12/724,413, 13/026,248, and related pending U.S. patent applications and is accordingly attributed to the associated inventors.

Embodiments Employing a Touchpad and Touchscreen Form of a HDTP

FIGS. 1a-1g (adapted from U.S. patent application Ser. No. 12/418,605) and FIGS. 2a-2e (adapted from U.S. Pat. No. 7,557,797) depict a number of arrangements and embodiments employing the HDTP technology. FIG. 1a illustrates an HDTP as a peripheral that can be used with a desktop computer (shown) or laptop) not shown). FIG. 1b depicts an HDTP integrated into a laptop in place of the traditional touchpad pointing device. In FIGS. 1a-1b the HDTP tactile sensor can be a stand-alone component or can be integrated over a display so as to form a touchscreen. FIG. 1c depicts an HDTP integrated into a desktop computer display so as to form a touchscreen. FIG. 1d shows the HDTP integrated into a laptop computer display so as to form a touchscreen.

FIG. 1e depicts an HDTP integrated into a cell phone, smartphone, PDA, or other hand-held consumer device. FIG. 1f shows an HDTP integrated into a test instrument, portable service-tracking device, portable service-entry device, field instrument, or other hand-held industrial device. In FIGS. 1e-1f the HDTP tactile sensor can be a stand-alone component or can be integrated over a display so as to form a touchscreen.

FIG. 1g depicts an HDTP touchscreen configuration that can be used in a tablet computer, wall-mount computer monitor, digital television, video conferencing screen, kiosk, etc.

In at least the arrangements of FIGS. 1a, 1c, 1d, and 1g, or other sufficiently large tactile sensor implementation of the HDTP, more than one hand can be used an individually recognized as such.

Embodiments Incorporating the HDTP into a Traditional or Contemporary Generation Mouse FIGS. 2a-2e and FIGS. 3a-3b (these adapted from U.S. Pat. No. 7,557,797) depict various integrations of an HDTP into the back of a conventional computer mouse. Any of these arrangements can employ a connecting cable, or the device can be wireless.

In the integrations depicted in FIGS. 2a-2d the HDTP tactile sensor can be a stand-alone component or can be integrated over a display so as to form a touchscreen. Such configurations have very recently become popularized by the product release of Apple "Magic Mouse™" although such combinations of a mouse with a tactile sensor array on its back responsive to multitouch and gestures were taught earlier in pending U.S. patent application Ser. No. 12/619,678 (priority date Feb. 12, 2004) entitled "User Interface Mouse with Touchpad Responsive to Gestures and Multi-Touch."

In another embodiment taught in the specification of issued U.S. Pat. No. 7,557,797 and associated pending continuation applications more than two touchpads can be included in the advance mouse embodiment, for example as suggested in the arrangement of FIG. 2e. As with the arrangements of FIGS. 2a-2d, one or more of the plurality of HDTP tactile sensors or exposed sensor areas of arrangements such as that of FIG. 2e can be integrated over a display so as to form a touchscreen. Other advance mouse arrangements include the integrated trackball/touchpad/mouse combinations of FIGS. 3a-3b taught in U.S. Pat. No. 7,557,797.

Overview of HDTP User Interface Technology

The information in this section provides an overview of HDTP user interface technology as described in U.S. Pat. No. 6,570,078, pending U.S. patent applications Ser. No. 11/761,978, 12/418,605, 12/502,230, 12/541,948, and related pending U.S. patent applications.

In an embodiment, a touchpad used as a pointing and data entry device can comprise an array of sensors. The array of sensors is used to create a tactile image of a type associated with the type of sensor and method of contact by the human hand.

In one embodiment, the individual sensors in the sensor array are pressure sensors and a direct pressure-sensing tactile image is generated by the sensor array.

In another embodiment, the individual sensors in the sensor array are proximity sensors and a direct proximity tactile image is generated by the sensor array. Since the contacting surfaces of the finger or hand tissue contacting a surface typically increasingly deforms as pressure is applied, the sensor array comprised of proximity sensors also provides an indirect pressure-sensing tactile image.

In another embodiment, the individual sensors in the sensor array can be optical sensors. In one variation of this, an optical image is generated and an indirect proximity tactile image is generated by the sensor array. In another variation, the optical image can be observed through a transparent or translucent rigid material and, as the contacting surfaces of the finger or hand tissue contacting a surface typically increasingly deforms as pressure is applied, the optical sensor array also provides an indirect pressure-sensing tactile image.

In another embodiment, the individual sensors in the sensor array can be on-off contact sensors.

In some embodiments, the array of sensors can be transparent or translucent and can be provided with an underlying visual display element such as an alphanumeric, graphics, or image display. The underlying visual display can comprise, for example, an LED array display, a backlit LCD, etc. Such an underlying display can be used to render geometric boundaries or labels for soft-key functionality implemented with the tactile sensor array, to display status information, etc. Tactile array sensors implemented as transparent touchscreens are taught in the 1999 filings of issued U.S. Pat. No. 6,570,078 and pending U.S. patent application Ser. No. 11/761,978.

In an embodiment, the touchpad or touchscreen can comprise a tactile sensor array obtains or provides individual measurements in every enabled cell in the sensor array that provides these as numerical values. The numerical values can be communicated in a numerical data array, as a sequential data stream, or in other ways. When regarded as a numerical data array with row and column ordering that can be associated with the geometric layout of the individual cells of the sensor array, the numerical data array can be regarded as representing a tactile image. The only tactile sensor array requirement to obtain the full functionality of the HDTP is that the tactile sensor array produce a multi-level gradient measurement image as a finger, part of hand, or other pliable object varies is proximity in the immediate area of the sensor surface.

Such a tactile sensor array should not be confused with the "null/contact" touchpad which, in normal operation, acts as a pair of orthogonally responsive potentiometers. These "null/contact" touchpads do not produce pressure images, proximity images, or other image data but rather, in normal operation, two voltages linearly corresponding to the location of a left-right edge and forward-back edge of a single area of contact. Such "null/contact" touchpads, which are universally found in existing laptop computers, are discussed and differentiated from tactile sensor arrays in issued U.S. Pat. No. 6,570,078 and pending U.S. patent application Ser. No. 11/761,978. Before leaving this topic, it is pointed out that these the "null/contact" touchpads nonetheless can be inexpensively adapted with simple analog electronics to provide at least primitive multi-touch capabilities as taught in issued U.S. Pat. No. 6,570,078 and pending U.S. patent application Ser. No. 11/761,978 (pre-grant publication U.S. 2007/0229477 and therein, paragraphs [0022]-[0029], for example).

More specifically, FIG. 4 (adapted from U.S. patent application Ser. No. 12/418,605) illustrates the side view of a finger 401 lightly touching the surface 402 of a tactile sensor array. In this example, the finger 401 contacts the tactile sensor surface in a relatively small area 403. In this situation, on either side the finger curves away from the region of contact 403, where the non-contacting yet proximate portions of the finger grow increasingly far 404a, 405a, 404b, 405b from the surface of the sensor 402. These variations in physical proximity of portions of the finger with respect to the sensor surface should cause each sensor element in the tactile proximity sensor array to provide a corresponding proximity measurement varying responsively to the proximity, separation distance, etc. The tactile proximity sensor array advantageously comprises enough spatial resolution to provide a plurality of sensors within the area occupied by the finger (for example, the area comprising width 406). In this case, as the finger is pressed down, the region of contact 403 grows as the more and more of the pliable surface of the finger conforms to the tactile sensor array surface 402, and the distances 404a, 405a, 404b, 405b contract. If the finger is tilted, for example by rolling in the user viewpoint counterclockwise (which in the depicted end-of-finger viewpoint clockwise 407a) the separation distances on one side of the finger 404a, 405a will contract while the separation distances on one side of the finger 404b, 405b will lengthen. Similarly if the finger is tilted, for example by rolling in the user viewpoint clockwise (which in the depicted end-of-finger viewpoint counterclockwise 407b) the separation distances on the side of the finger 404b, 405b will contract while the separation distances on the side of the finger 404a, 405a will lengthen.

In many various embodiments, the tactile sensor array can be connected to interface hardware that sends numerical data responsive to tactile information captured by the tactile sensor array to a processor. In various embodiments, this processor will process the data captured by the tactile sensor array and transform it various ways, for example into a collection of simplified data, or into a sequence of tactile image "frames" (this sequence akin to a video stream), or into highly refined information responsive to the position and movement of one or more fingers and other parts of the hand.

As to further detail of the latter example, a "frame" can refer to a 2-dimensional list, number of rows by number of columns, of tactile measurement value of every pixel in a tactile sensor array at a given instance. The time interval between one frame and the next one depends on the frame rate of the system and the number of frames in a unit time (usually frames per second). However, these features are and are not firmly required. For example, in some embodiments a tactile sensor array can not be structured as a 2-dimensional array but rather as row-aggregate and column-aggregate measurements (for example row sums and columns sums as in the tactile sensor of 2003-2006 Apple Powerbooks, row and column interference measurement data as can be provided by a surface acoustic wave or optical transmission modulation sensor as discussed later in the context of FIG. 13, etc.). Additionally, the frame rate can be adaptively-variable rather than fixed, or the frame can be segregated into a plurality regions each of which are scanned in parallel or conditionally (as taught in U.S. Pat. No. 6,570,078 and pending U.S. patent application Ser. No. 12/418,605), etc.

FIG. 5a (adapted from U.S. patent application Ser. No. 12/418,605) depicts a graphical representation of a tactile image produced by contact with the bottom surface of the most outward section (between the end of the finger and the most nearby joint) of a human finger on a tactile sensor array. In this tactile array, there are 24 rows and 24 columns; other realizations can have significantly more (hundreds or thousands) of rows and columns. Tactile measurement values of each cell are indicated by the numbers and shading in each cell. Darker cells represent cells with higher tactile measurement values. Similarly, FIG. 5b (also adapted from U.S. patent application Ser. No. 12/418,605) provides a graphical representation of a tactile image produced by contact with multiple human fingers on a tactile sensor array. In other embodiments, there can be a larger or smaller number of pixels for a given images size, resulting in varying resolution. Additionally, there can be larger or smaller area with respect to the image size resulting in a greater or lesser potential measurement area for the region of contact to be located in or move about.

FIG. 6 (adapted from U.S. patent application Ser. No. 12/418,605) depicts a realization wherein a tactile sensor array is provided with real-time or near-real-time data acquisition capabilities. The captured data reflects spatially distributed tactile measurements (such as pressure, proximity, etc.). The tactile sensory array and data acquisition stage provides this real-time or near-real-time tactile measurement data to a specialized image processing arrangement for the production of parameters, rates of change of those parameters, and symbols responsive to aspects of the hand's relationship with the tactile or other type of sensor array. In some applications, these measurements can be used directly. In other situations, the real-time or near-real-time derived parameters can be directed to mathematical mappings (such as scaling, offset, and nonlinear warpings) in real-time or near-real-time into real-time or near-real-time application-specific parameters or other representations useful for applications. In some embodiments, general purpose outputs can be assigned to variables defined or expected by the application.

Types of Tactile Sensor Arrays

The tactile sensor array employed by HDTP technology can be implemented by a wide variety of means, for example:

Pressure sensor arrays (implemented by for example—although not limited to—one or more of resistive, capacitive, piezo, optical, acoustic, or other sensing elements);

Pressure sensor arrays (implemented by for example—although not limited to—one or more of resistive, capacitive, piezo, optical, acoustic, or other sensing elements);

Proximity sensor arrays (implemented by for example—although not limited to—one or more of capacitive, optical, acoustic, or other sensing elements);

Surface-contact sensor arrays (implemented by for example—although not limited to—one or more of resistive, capacitive, piezo, optical, acoustic, or other sensing elements).

Figure 7:
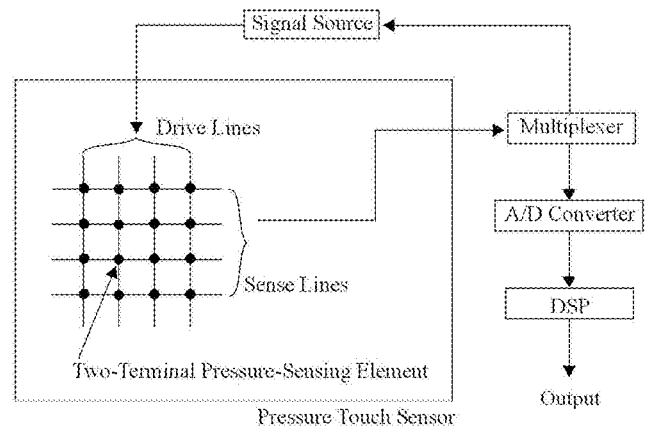
FIG. 7 depicts a pressure sensor array arrangement.
Figure 8:
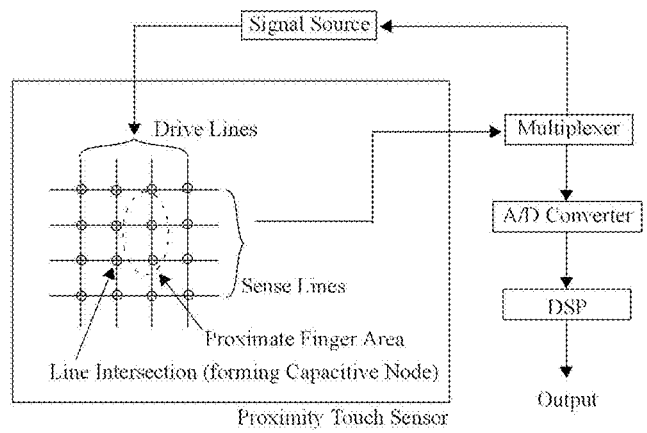
FIG. 8 depicts a popularly accepted view of a typical cell phone or PDA capacitive proximity sensor implementation.
Figure 11:
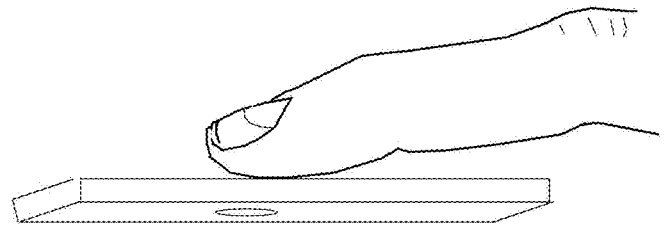
FIG. 11 depicts an embodiment of an arrangement comprising a video camera capturing the image of the contact of parts of the hand with a transparent or translucent surface.

Below a few specific examples of the above are provided by way of illustration; however these are by no means limiting. The examples include:

Pressure sensor arrays comprising arrays of isolated sensors (FIG. 7);

Capacitive proximity sensors (FIG. 8);

Multiplexed LED optical reflective proximity sensors (FIG. 9);

Video camera optical reflective sensing (as taught in U.S. Pat. No. 6,570,078 and U.S. patent applications Ser. Nos. 10/683,915 and 11/761,978):

direct image of hand (FIGS. 10a-10c);

image of deformation of material (FIG. 11);

Surface contract refraction/absorption (FIG. 12);

Arrays of on-off contact sensors.

An example implementation of a tactile sensor array is a pressure sensor array. Pressure sensor arrays discussed in U.S. Pat. No. 6,570,078 and pending U.S. patent application Ser. No. 11/761,978. FIG. 7 depicts a pressure sensor array arrangement comprising a rectangular array of isolated individual two-terminal pressure sensor elements. Such two-terminal pressure sensor elements typically operate by measuring changes in electrical (resistive, capacitive) or optical properties of an elastic material as the material is compressed. In typical embodiment, each sensor element in the sensor array can be individually accessed via multiplexing arrangement, for example as shown in FIG. 7, although other arrangements are possible and provided for by the invention. Examples of prominent manufacturers and suppliers of pressure sensor arrays include Tekscan, Inc. (307 West First Street., South Boston, Mass. 02127), Pressure Profile Systems (5757 Century Boulevard, Suite 600, Los Angeles, Calif. 90045), Sensor Products, Inc. (300 Madison Avenue, Madison, N.J. 07940 USA), and Xsensor Technology Corporation (Suite 111, 319-2nd Ave SW, Calgary, Alberta T2P 0C5, Canada).

Capacitive proximity sensors can be used in various handheld devices with touch interfaces. Prominent manufacturers and suppliers of such sensors, both in the form of opaque touchpads and transparent touch screens, include Balda AG (Bergkirchener Str. 228, 32549 Bad Oeynhausen, DE), Cypress (198 Champion Ct., San Jose, Calif. 95134), and Synaptics (2381 Bering Dr., San Jose, Calif. 95131). In such sensors, the region of finger contact is detected by variations in localized capacitance resulting from capacitive proximity effects induced by an overlapping or otherwise nearly-adjacent finger. More specifically, the electrical field at the intersection of orthogonally-aligned conductive buses is influenced by the vertical distance or gap between the surface of the sensor array and the skin surface of the finger. Such capacitive proximity sensor technology is low-cost, reliable, long-life, stable, and can readily be made transparent. FIG. 8 shows a popularly accepted view of a typical cell phone or PDA capacitive proximity sensor implementation. Capacitive sensor arrays of this type can be highly susceptible to noise and various shielding and noise-suppression electronics and systems techniques can need to be employed for adequate stability, reliability, and performance in various electric field and electromagnetically-noisy environments. In some embodiments of an HDTP, the present invention can use the same spatial resolution as current capacitive proximity touchscreen sensor arrays. In other embodiments of the present invention, a higher spatial resolution is advantageous.

Forrest M. Mims is credited as showing that an LED can be used as a light detector as well as a light emitter. Recently, light-emitting diodes have been used as a tactile proximity sensor array. Such tactile proximity array implementations typically need to be operated in a darkened environment (as seen in the video in the above web link). In one embodiment provided for by the invention, each LED in an array of LEDs can be used as a photodetector as well as a light emitter, although a single LED can either transmit or receive information at one time. Each LED in the array can sequentially be selected to be set to be in receiving mode while others adjacent to it are placed in light emitting mode. A particular LED in receiving mode can pick up reflected light from the finger, provided by said neighboring illuminating-mode LEDs. FIG. 9 depicts an implementation. The invention provides for additional systems and methods for not requiring darkness in the user environment in order to operate the LED array as a tactile proximity sensor. In one embodiment, potential interference from ambient light in the surrounding user environment can be limited by using an opaque pliable or elastically deformable surface covering the LED array that is appropriately reflective (directionally, amorphously, etc. as can be advantageous in a particular design) on the side facing the LED array. Such a system and method can be readily implemented in a wide variety of ways as is clear to one skilled in the art. In another embodiment, potential interference from ambient light in the surrounding user environment can be limited by employing amplitude, phase, or pulse width modulated circuitry or software to control the underlying light emission and receiving process. For example, in an implementation the LED array can be configured to emit modulated light modulated at a particular carrier frequency or variational waveform and respond to only modulated light signal components extracted from the received light signals comprising that same carrier frequency or variational waveform. Such a system and method can be readily implemented in a wide variety of ways as is clear to one skilled in the art.

Use of video cameras for gathering control information from the human hand in various ways is discussed in U.S. Pat. No. 6,570,078 and Pending U.S. patent applications Ser. No. 10/683,915. Here the camera image array is employed as an HDTP tactile sensor array. Images of the human hand as captured by video cameras can be used as an enhanced multiple-parameter interface responsive to hand positions and gestures, for example as taught in U.S. patent application Ser. No. 10/683,915 Pre-Grant-Publication 2004/0118268 (paragraphs [314], [321]-[332], [411], [653], both stand-alone and in view of [325], as well as [241]-[263]). FIGS. 10a and 10b depict single camera implementations, while FIG. 10c depicts a two camera implementation. As taught in the aforementioned references, a wide range of relative camera sizes and positions with respect to the hand are provided for, considerably generalizing the arrangements shown in FIGS. 10a-10c In another video camera tactile controller embodiment, a flat or curved transparent or translucent surface or panel can be used as sensor surface. When a finger is placed on the transparent or translucent surface or panel, light applied to the opposite side of the surface or panel reflects light in a distinctly different manner than in other regions where there is no finger or other tactile contact. The image captured by an associated video camera will provide gradient information responsive to the contact and proximity of the finger with respect to the surface of the translucent panel. For example, the parts of the finger that are in contact with the surface will provide the greatest degree of reflection while parts of the finger that curve away from the surface of the sensor provide less reflection of the light. Gradients of the reflected light captured by the video camera can be arranged to produce a gradient image that appears similar to the multilevel quantized image captured by a pressure sensor. By comparing changes in gradient, changes in the position of the finger and pressure applied by the finger can be detected. FIG. 11 depicts an implementation.

Figure 12A:
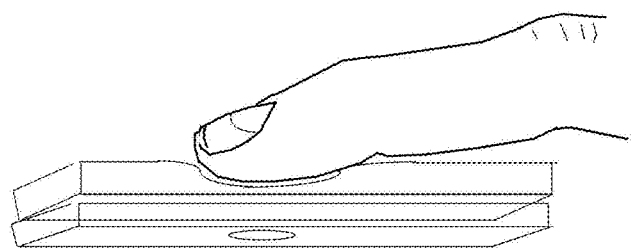
FIGS. 12a-12b depict an implementation of an arrangement comprising a video camera capturing the image of a deformable material whose image varies according to applied pressure.
Figure 12B:
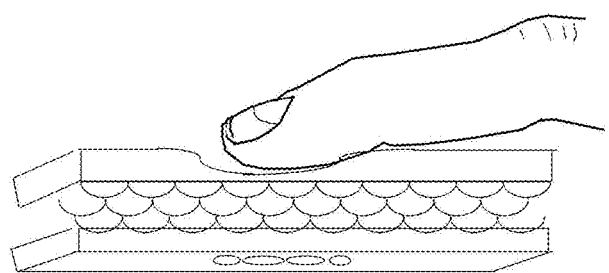

FIGS. 12a-12b depict an implementation of an arrangement comprising a video camera capturing the image of a deformable material whose image varies according to applied pressure. In the example of FIG. 12a, the deformable material serving as a touch interface surface can be such that its intrinsic optical properties change in response to deformations, for example by changing color, index of refraction, degree of reflectivity, etc. In another approach, the deformable material can be such that exogenous optic phenomena are modulated n response to the deformation. As an example, the arrangement of FIG. 12b is such that the opposite side of the deformable material serving as a touch interface surface comprises deformable bumps which flatten out against the rigid surface of a transparent or translucent surface or panel. The diameter of the image as seen from the opposite side of the transparent or translucent surface or panel increases as the localized pressure from the region of hand contact increases. Such an approach was created by Professor Richard M. White at U.C. Berkeley in the 1980's.

Figure 13:
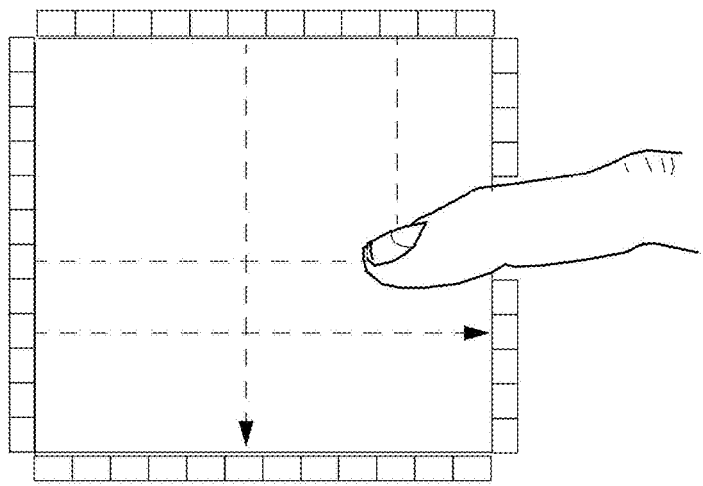
FIG. 13 depicts an implementation of an optical or acoustic diffraction or absorption arrangement that can be used for contact or pressure sensing of tactile contact.

FIG. 13 depicts an optical or acoustic diffraction or absorption arrangement that can be used for contact or pressure sensing of tactile contact. Such a system can employ, for example light or acoustic waves. In this class of methods and systems, contact with or pressure applied onto the touch surface causes disturbances (diffraction, absorption, reflection, etc.) that can be sensed in various ways. The light or acoustic waves can travel within a medium comprised by or in mechanical communication with the touch surface. A slight variation of this is where surface acoustic waves travel along the surface of, or interface with, a medium comprised by or in mechanical communication with the touch surface.

Compensation for Non-Ideal Behavior of Tactile Sensor Arrays

Individual sensor elements in a tactile sensor array produce measurements that vary sensor-by-sensor when presented with the same stimulus. Inherent statistical averaging of the algorithmic mathematics can damp out much of this, but for small image sizes (for example, as rendered by a small finger or light contact), as well as in cases where there are extremely large variances in sensor element behavior from sensor to sensor, the invention provides for each sensor to be individually calibrated in implementations where that can be advantageous. Sensor-by-sensor measurement value scaling, offset, and nonlinear warpings can be invoked for all or selected sensor elements during data acquisition scans. Similarly, the invention provides for individual noisy or defective sensors can be tagged for omission during data acquisition scans.

Figure 14:
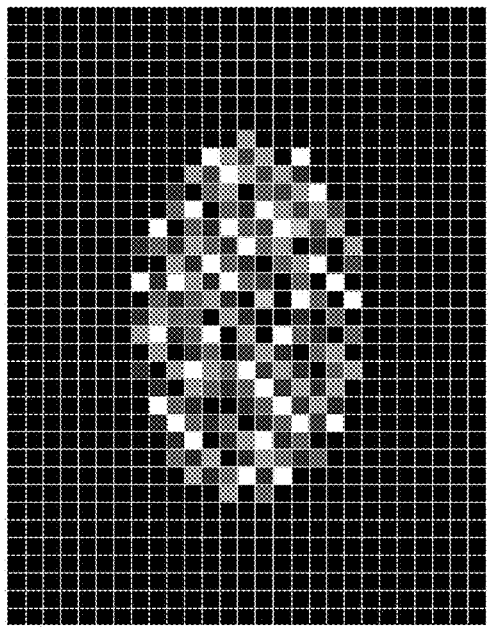
FIG. 14 shows a finger image wherein rather than a smooth gradient in pressure or proximity values there is radical variation due to non-uniformities in offset and scaling terms among the sensors.

FIG. 14 shows a finger image wherein rather than a smooth gradient in pressure or proximity values there is radical variation due to non-uniformities in offset and scaling terms among the sensors.

Figure 15:
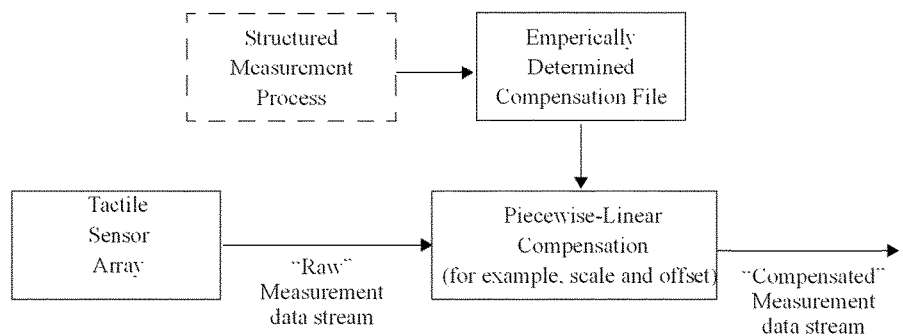
FIG. 15 shows a sensor-by-sensor compensation arrangement.

FIG. 15 shows a sensor-by-sensor compensation arrangement for such a situation. A structured measurement process applies a series of known mechanical stimulus values (for example uniform applied pressure, uniform simulated proximity, etc.) to the tactile sensor array and measurements are made for each sensor. Each measurement data point for each sensor is compared to what the sensor should read and a piecewise-linear correction is computed. In an embodiment, the coefficients of a piecewise-linear correction operation for each sensor element are stored in a file. As the raw data stream is acquired from the tactile sensor array, sensor-by-sensor the corresponding piecewise-linear correction coefficients are obtained from the file and used to invoke a piecewise-linear correction operation for each sensor measurement. The value resulting from this time-multiplexed series of piecewise-linear correction operations forms an outgoing "compensated" measurement data stream. Such an arrangement is employed, for example, as part of the aforementioned Tekscan resistive pressure sensor array products.

Figure 16:
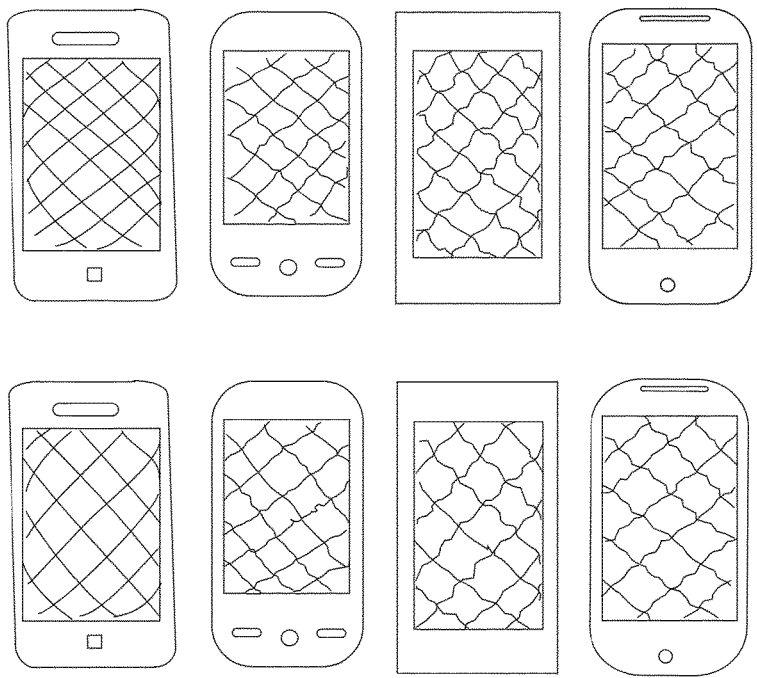
FIG. 16 depicts the comparative performance of a group of contemporary handheld devices wherein straight lines were entered using the surface of the respective touchscreens.

Additionally, the macroscopic arrangement of sensor elements can introduce nonlinear spatial warping effects. As an example, various manufacturer implementations of capacitive proximity sensor arrays and associated interface electronics are known to comprise often dramatic nonlinear spatial warping effects. FIG. 16 depicts the comparative performance of a group of contemporary handheld devices wherein straight lines were entered using the surface of the respective touchscreens. A common drawing program was used on each device, with widely-varying type and degrees of nonlinear spatial warping effects clearly resulting. For simple gestures such as selections, finger-flicks, drags, spreads, etc., such nonlinear spatial warping effects introduce little consequence. For more precision applications, such nonlinear spatial warping effects introduce unacceptable performance. Close study of FIG. 16 shows different types of responses to tactile stimulus in the direct neighborhood of the relatively widely-spaced capacitive sensing nodes versus tactile stimulus in the boundary regions between capacitive sensing nodes. Increasing the number of capacitive sensing nodes per unit area can reduce this, as can adjustments to the geometry of the capacitive sensing node conductors. In many cases improved performance can be obtained by introducing or more carefully implementing interpolation mathematics.

Types of Hand Contact Measurements and Features Provided by HDTP Technology

Figure 17A:
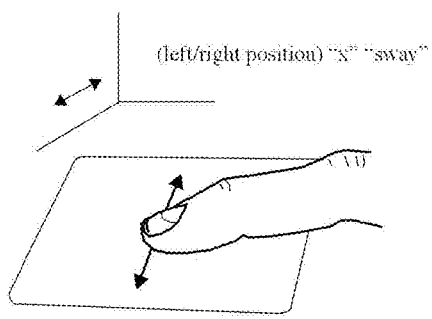
FIGS. 17a-17f illustrate the six independently adjustable degrees of freedom of touch from a single finger that can be simultaneously measured by the HDTP technology.
Figure 17D:
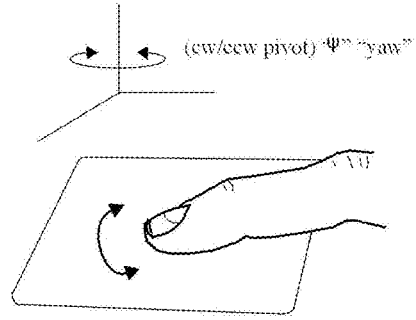
Figure 17B:
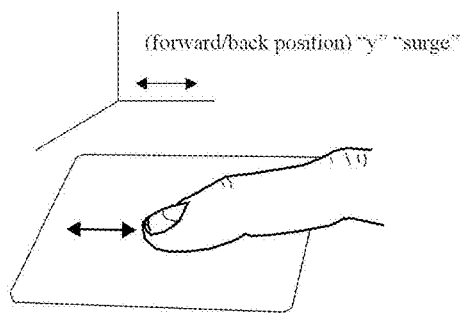
Figure 17E:
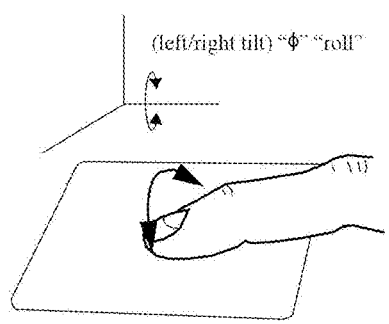
Figure 17C:
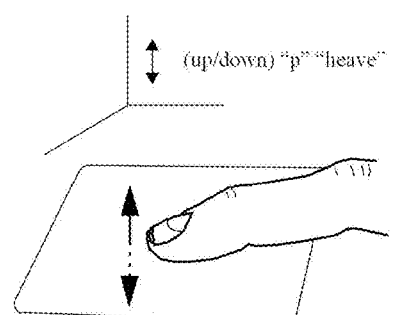
Figure 17F:
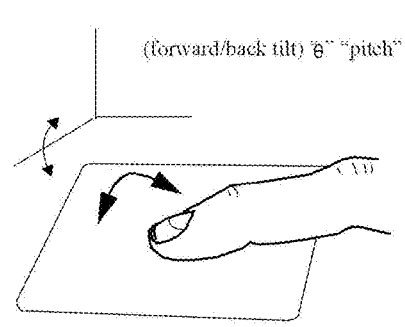

FIGS. 17a-17f (adapted from U.S. patent application Ser. No. 12/418,605 and described in U.S. Pat. No. 6,570,078) illustrate six independently adjustable degrees of freedom of touch from a single finger that can be simultaneously measured by the HDTP technology. The depiction in these figures is from the side of the touchpad. FIGS. 17a-17c show actions of positional change (amounting to applied pressure in the case of FIG. 17c) while FIGS. 17d-17f show actions of angular change. Each of these can be used to control a user interface parameter, allowing the touch of a single fingertip to control up to six simultaneously-adjustable quantities in an interactive user interface.

Each of the six parameters listed above can be obtained from operations on a collection of sums involving the geometric location and tactile measurement value of each tactile measurement sensor. Of the six parameters, the left-right geometric center, forward-back geometric center, and clockwise-counterclockwise yaw rotation can be obtained from binary threshold image data. The average downward pressure, roll, and pitch parameters are in some embodiments beneficially calculated from gradient (multi-level) image data. One remark is that because binary threshold image data is sufficient for the left-right geometric center, forward-back geometric center, and clockwise-counterclockwise yaw rotation parameters, these also can be discerned for flat regions of rigid non-pliable objects, and thus the HDTP technology thus can be adapted to discern these three parameters from flat regions with striations or indentations of rigid non-pliable objects.

These 'Position Displacement' parameters FIGS. 17a-17c can be realized by various types of unweighted averages computed across the blob of one or more of each the geometric location and tactile measurement value of each above-threshold measurement in the tactile sensor image. The pivoting rotation can be calculated from a least-squares slope which in turn involves sums taken across the blob of one or more of each the geometric location and the tactile measurement value of each active cell in the image; alternatively a high-performance adapted eigenvector method taught in co-pending provisional patent application U.S. Ser. No. 12/724,413 "High-Performance Closed-Form Single-Scan Calculation of Oblong-Shape Rotation Angles from Binary Images of Arbitrary Size Using Running Sums," filed Mar. 14, 2009, can be used. The last two angle ("tilt") parameters, pitch and roll, can be realized by performing calculations on various types of weighted averages as well as a number of other methods.

Each of the six parameters portrayed in FIGS. 17a-17f can be measured separately and simultaneously in parallel. FIG. 18 (adapted from U.S. Pat. No. 6,570,078) suggests general ways in which two or more of these independently adjustable degrees of freedom adjusted at once.

The HDTP technology provides for multiple points of contact, these days referred to as "multi-touch." FIG. 19 (adapted from U.S. patent application Ser. No. 12/418,605 and described in U.S. Pat. No. 6,570,078) demonstrates a few two-finger multi-touch postures or gestures from the hundreds that can be readily recognized by HDTP technology. HDTP technology can also be configured to recognize and measure postures and gestures involving three or more fingers, various parts of the hand, the entire hand, multiple hands, etc. Accordingly, the HDTP technology can be configured to measure areas of contact separately, recognize shapes, fuse measures or pre-measurement data so as to create aggregated measurements, and other operations.

Figure 20:
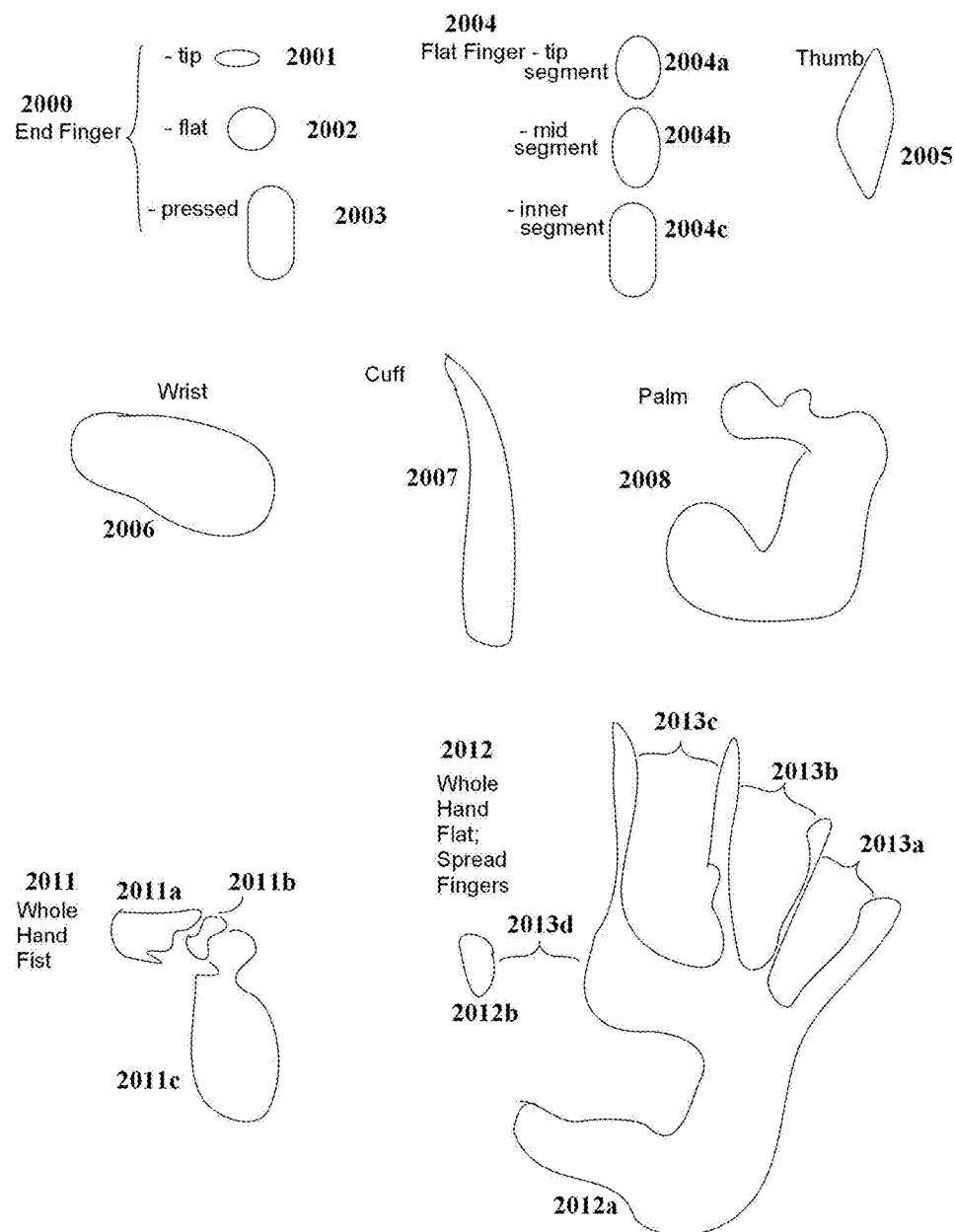
FIG. 20 illustrates the pressure profiles for a number of example hand contacts with a pressure-sensor array.

By way of example, FIG. 20 (adapted from U.S. Pat. No. 6,570,078) illustrates the pressure profiles for a number of example hand contacts with a pressure-sensor array. In the case 2000 of a finger's end, pressure on the touch pad pressure-sensor array can be limited to the finger tip, resulting in a spatial pressure distribution profile 2001; this shape does not change much as a function of pressure. Alternatively, the finger can contact the pad with its flat region, resulting in light pressure profiles 2002 which are smaller in size than heavier pressure profiles 2003. In the case 2004 where the entire finger touches the pad, a three-segment pattern (2004a, 2004b, 2004c) will result under many conditions; under light pressure a two segment pattern (2004b or 2004c missing) could result. In all but the lightest pressures the thumb makes a somewhat discernible shape 2005 as do the wrist 2006, edge-of-hand "cuff" 2007, and palm 2008; at light pressures these patterns thin and can also break into disconnected regions. Whole hand patterns such the fist 2011 and flat hand 2012 have more complex shapes. In the case of the fist 2011, a degree of curl can be discerned from the relative geometry and separation of sub-regions (here depicted, as an example, as 2011a, 2011b, and 2011c). In the case of the whole flat hand 2000, there can be two or more sub-regions which can be in fact joined (as within 2012a) or disconnected (as an example, as 2012a and 2012b are); the whole hand also affords individual measurement of separation "angles" among the digits and thumb (2013a, 2013b, 2013c, 2013d) which can easily be varied by the user.

Figure 21:
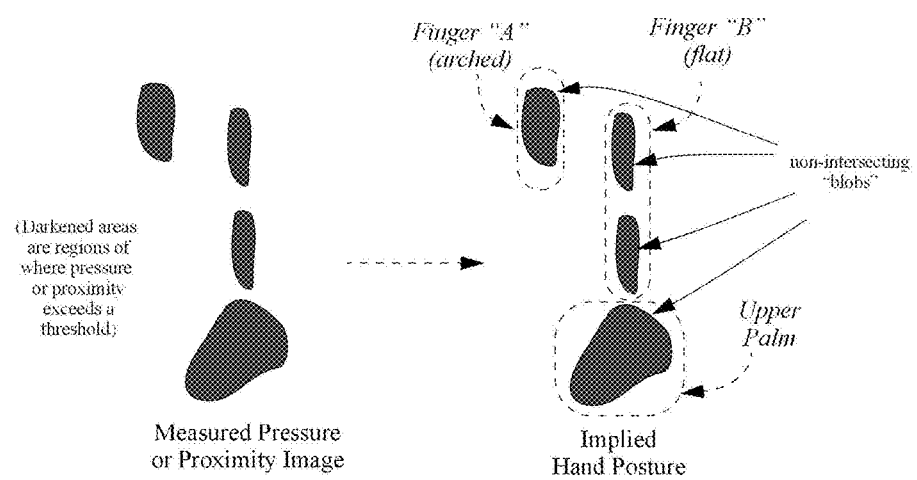
FIG. 21 depicts one of a wide range of tactile sensor images that can be measured by using more of the human hand

HDTP technology robustly provides feature-rich capability for tactile sensor array contact with two or more fingers, with other parts of the hand, or with other pliable (and for some parameters, non-pliable) objects. In one embodiment, one finger on each of two different hands can be used together to at least double number of parameters that can be provided. Additionally, new parameters particular to specific hand contact configurations and postures can also be obtained. By way of example, FIG. 21 (adapted from U.S. patent application Ser. No. 12/418,605 and described in U.S. Pat. No. 6,570,078) depicts one of a wide range of tactile sensor images that can be measured by using more of the human hand. U.S. Pat. No. 6,570,078 and pending U.S. patent application Ser. No. 11/761,978 provide additional detail on use of other parts of hand. Within the context of the example of FIG. 21:

- multiple fingers can be used with the tactile sensor array, with or without contact by other parts of the hand;
- The whole hand can be tilted & rotated;
- The thumb can be independently rotated in yaw angle with respect to the yaw angle held by other fingers of the hand;
- Selected fingers can be independently spread, flatten, arched, or lifted;
- The palms and wrist cuff can be used;
- Shapes of individual parts of the hand and combinations of them can be recognized.

Selected combinations of such capabilities can be used to provide an extremely rich pallet of primitive control signals that can be used for a wide variety of purposes and applications.

Other HDTP Processing, SignalFlows, and Operations

In order to accomplish this range of capabilities, HDTP technologies must be able to parse tactile images and perform operations based on the parsing. In general, contact between the tactile-sensor array and multiple parts of the same hand forfeits some degrees of freedom but introduces others. For example, if the end joints of two fingers are pressed against the sensor array as in FIG. 21, it will be difficult or impossible to induce variations in the image of one of the end joints in six different dimensions while keeping the image of the other end joints fixed. However, there are other parameters that can be varied, such as the angle between two fingers, the difference in coordinates of the finger tips, and the differences in pressure applied by each finger.

In general, compound images can be adapted to provide control over many more parameters than a single contiguous image can. For example, the two-finger postures considered above can readily provide a nine-parameter set relating to the pair of fingers as a separate composite object adjustable within an ergonomically comfortable range. One example nine-parameter set the two-finger postures consider above is:
composite average x position;
inter-finger differential x position;
composite average y position;
inter-finger differential y position;
composite average pressure;
inter-finger differential pressure;
composite roll;
composite pitch;
composite yaw.

As another example, by using the whole hand pressed flat against the sensor array including the palm and wrist, it is readily possible to vary as many as sixteen or more parameters independently of one another. A single hand held in any of a variety of arched or partially-arched postures provides a very wide range of postures that can be recognized and parameters that can be calculated.

When interpreted as a compound image, extracted parameters such as geometric center, average downward pressure, tilt (pitch and roll), and pivot (yaw) can be calculated for the entirety of the asterism or constellation of smaller blobs. Additionally, other parameters associated with the asterism or constellation can be calculated as well, such as the aforementioned angle of separation between the fingers. Other examples include the difference in downward pressure applied by the two fingers, the difference between the left-right ("x") centers of the two fingertips, and the difference between the two forward-back ("y") centers of the two fingertips. Other compound image parameters are possible and are provided by HDTP technology.

Figures 22A, 22B:
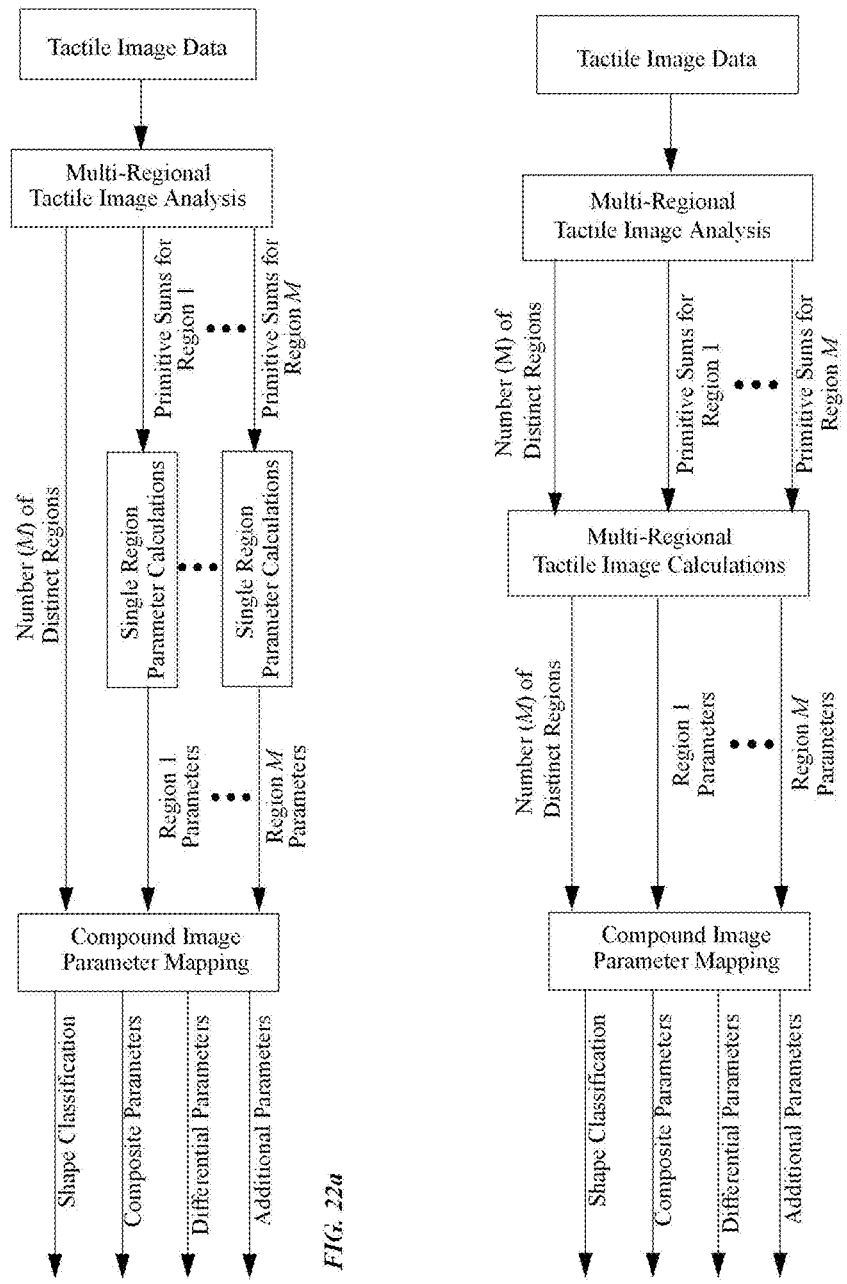
FIGS. 22a-22c depict various approaches to the handling of compound posture data images.

There are number of ways for implementing the handling of compound posture data images. Two contrasting examples are depicted in FIGS. 22a-22b (adapted from U.S. patent application Ser. No. 12/418,605) although many other possibilities exist and are provided for by the invention. In the embodiment of FIG. 22a, tactile image data is examined for the number "M" of isolated blobs ("regions") and the primitive running sums are calculated for each blob. This can be done, for example, with the algorithms described earlier. Post-scan calculations can then be performed for each blob, each of these producing an extracted parameter set (for example, x position, y position, average pressure, roll, pitch, yaw) uniquely associated with each of the M blobs ("regions"). The total number of blobs and the extracted parameter sets are directed to a compound image parameter mapping function to produce various types of outputs, including:
Shape classification (for example finger tip, first-joint flat finger, two-joint flat finger, three joint-flat finger, thumb, palm, wrist, compound two-finger, compound three-finger, composite 4-finger, whole hand, etc.);
Composite parameters (for example composite x position, composite y position, composite average pressure, composite roll, composite pitch, composite yaw, etc.);
Differential parameters (for example pair-wise inter-finger differential x position, pair-wise inter-finger differential y position, pair-wise inter-finger differential pressure, etc.);
Additional parameters (for example, rates of change with respect to time, detection that multiple finger images involve multiple hands, etc.).

FIG. 22b depicts an alternative embodiment, tactile image data is examined for the number M of isolated blobs ("regions") and the primitive running sums are calculated for each blob, but this information is directed to a multi-regional tactile image parameter extraction stage. Such a stage can include, for example, compensation for minor or major ergonomic interactions among the various degrees of postures of the hand. The resulting compensation or otherwise produced extracted parameter sets (for example, x position, y position, average pressure, roll, pitch, yaw) uniquely associated with each of the M blobs and total number of blobs are directed to a compound image parameter mapping function to produce various types of outputs as described for the arrangement of FIG. 22a.

Additionally, embodiments of the invention can be set up to recognize one or more of the following possibilities:
Single contact regions (for example a finger tip);
Multiple independent contact regions (for example multiple fingertips of one or more hands);
Fixed-structure ("constellation") compound regions (for example, the palm, multiple-joint finger contact as with a flat finger, etc.);
Variable-structure ("asterism") compound regions (for example, the palm, multiple-joint finger contact as with a flat finger, etc.).

Embodiments that recognize two or more of these possibilities can further be able to discern and process combinations of two more of the possibilities.

Figure 22C:
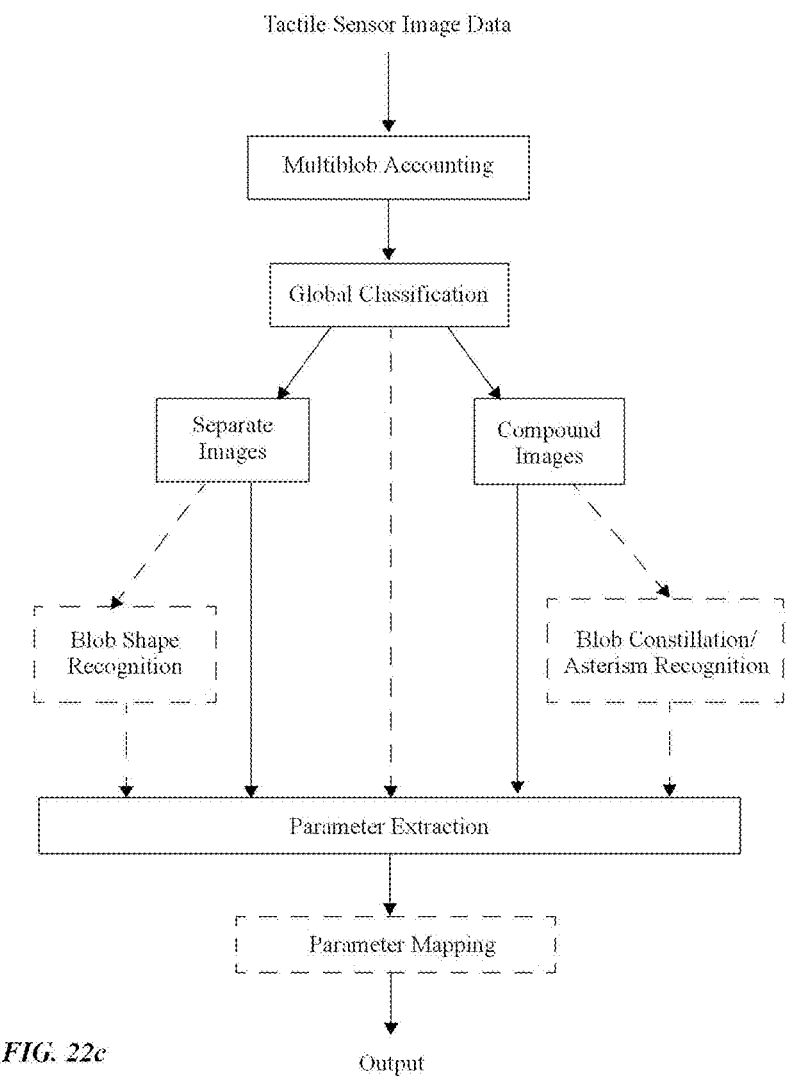

FIG. 22c (adapted from U.S. patent application Ser. No. 12/418,605) depicts a simple system for handling one, two, or more of the above listed possibilities, individually or in combination. In the general arrangement depicted, tactile sensor image data is analyzed (for example, in the ways described earlier) to identify and isolate image data associated with distinct blobs. The results of this multiple-blob accounting is directed to one or more global classification functions set up to effectively parse the tactile sensor image data into individual separate blob images or individual compound images. Data pertaining to these individual separate blob or compound images are passed on to one or more parallel or serial parameter extraction functions. The one or more parallel or serial parameter extraction functions can also be provided information directly from the global classification function(s). Additionally, data pertaining to these individual separate blob or compound images are passed on to additional image recognition function(s), the output of which can also be provided to one or more parallel or serial parameter extraction function(s). The output(s) of the parameter extraction function(s) can then be either used directly, or first processed further by parameter mapping functions. Clearly other implementations are also possible to one skilled in the art and these are provided for by the invention.

Refining of the HDTP User Experience

Figure 23:
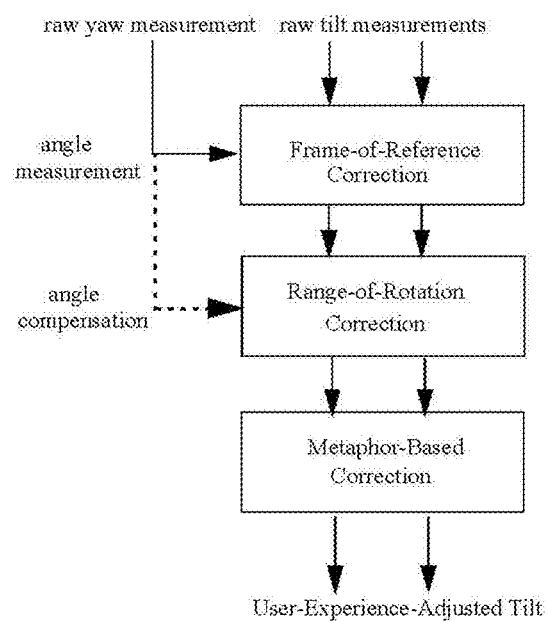
FIG. 23 illustrates correcting tilt coordinates with knowledge of the measured yaw angle, compensating for the expected tilt range variation as a function of measured yaw angle, and matching the user experience of tilt with a selected metaphor interpretation.

As an example of user-experience correction of calculated parameters, it is noted that placement of hand and wrist at a sufficiently large yaw angle can affect the range of motion of tilting. As the rotation angle increases in magnitude, the range of tilting motion decreases as mobile range of human wrists gets restricted. The invention provides for compensation for the expected tilt range variation as a function of measured yaw rotation angle. An embodiment is depicted in the middle portion of FIG. 23 (adapted from U.S. patent application Ser. No. 12/418,605). As another example of user-experience correction of calculated parameters, the user and application can interpret the tilt measurement in a variety of ways. In one variation for this example, tilting the finger can be interpreted as changing an angle of an object, control dial, etc. in an application. In another variation for this example, tilting the finger can be interpreted by an application as changing the position of an object within a plane, shifting the position of one or more control sliders, etc. Typically each of these interpretations would require the application of at least linear, and typically nonlinear, mathematical transformations so as to obtain a matched user experience for the selected metaphor interpretation of tilt. In one embodiment, these mathematical transformations can be performed as illustrated in the lower portion of FIG. 23. The invention provides for embodiments with no, one, or a plurality of such metaphor interpretation of tilt.

Figure 24A:
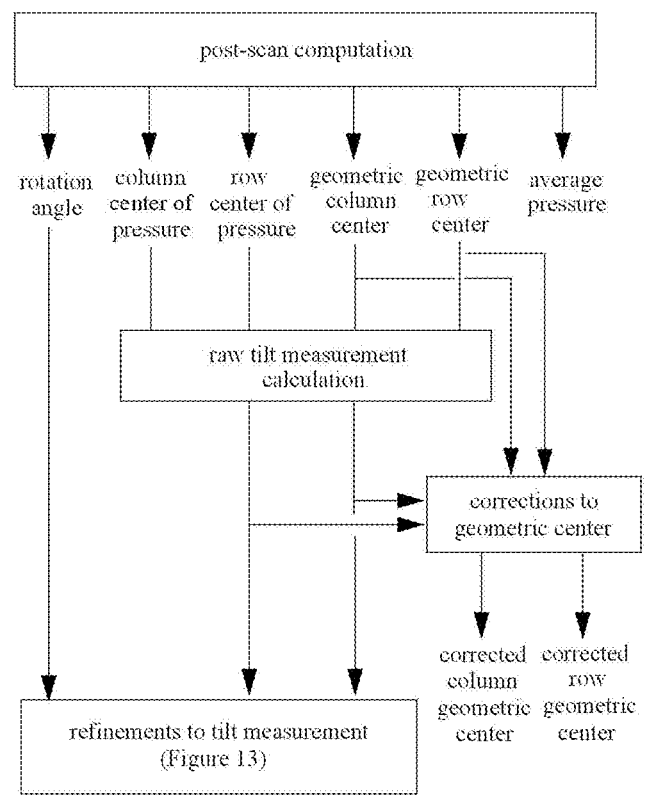
FIG. 24a depicts an embodiment wherein the raw tilt measurement is used to make corrections to the geometric center measurement under at least conditions of varying the tilt of the finger.
Figure 24B:
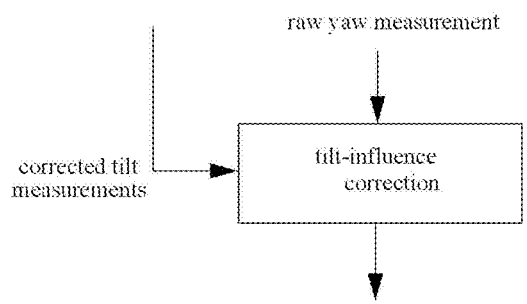
FIG. 24b depicts an embodiment for yaw angle compensation in systems and situations wherein the yaw measurement is sufficiently affected by tilting of the finger.

As the finger is tilted to the left or right, the shape of the area of contact becomes narrower and shifts away from the center to the left or right. Similarly as the finger is tilted forward or backward, the shape of the area of contact becomes shorter and shifts away from the center forward or backward. For a better user experience, the invention provides for embodiments to include systems and methods to compensate for these effects (i.e. for shifts in blob size, shape, and center) as part of the tilt measurement portions of the implementation. Additionally, the raw tilt measures can also typically be improved by additional processing. FIG. 24*a* (adapted from U.S. patent application Ser. No. 12/418, 605) depicts an embodiment wherein the raw tilt measurement is used to make corrections to the geometric center measurement under at least conditions of varying the tilt of the finger. Additionally, the invention provides for yaw angle compensation for systems and situations wherein the yaw measurement is sufficiently affected by tilting of the finger. An embodiment of this correction in the data flow is shown in FIG. 24*b* (adapted from U.S. patent application Ser. No. 12/418,605).

Additional HDTP Processing, Signal Flows, and Operations

Figure 25:
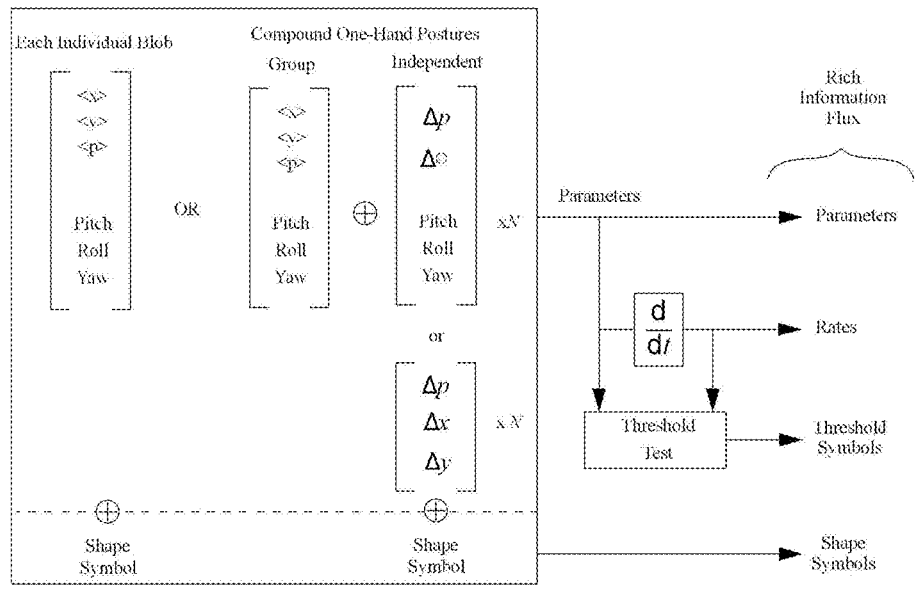
FIG. 25 shows an arrangement wherein raw measurements of the six quantities of FIGS. 17a-17f, together with multitouch parsing capabilities and shape recognition for distinguishing contact with various parts of the hand and the touchpad can be used to create a rich information flux of parameters, rates, and symbols.

FIG. 25 (adapted from U.S. patent application Ser. No. 12/418,605 and described in U.S. Pat. No. 6,570,078) shows an example of how raw measurements of the six quantities of FIGS. 17*a*-17*f*, together with shape recognition for distinguishing contact with various parts of the hand and the touchpad, can be used to create a rich information flux of parameters, rates, and symbols.

Figure 26:
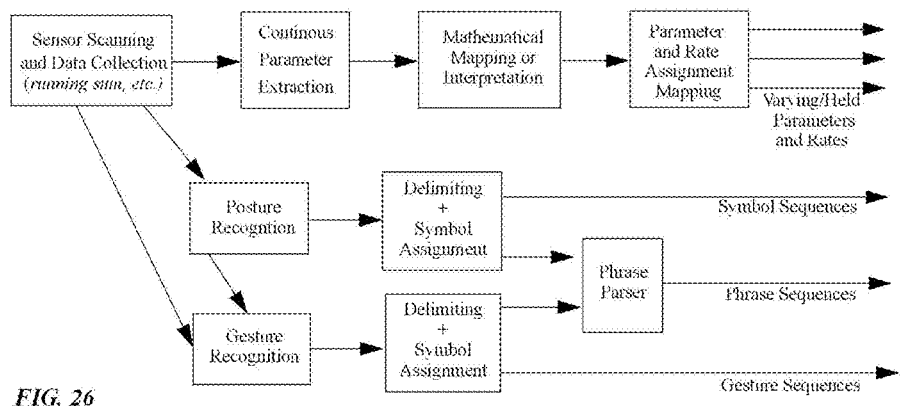
FIG. 26 shows an approach for incorporating posture recognition, gesture recognition, state machines, and parsers to create an even richer human/machine tactile interface system capable of incorporating syntax and grammars.

FIG. 26 (adapted from U.S. patent application Ser. No. 12/418,605 and described in U.S. Pat. No. 6,570,078) shows an approach for incorporating posture recognition, gesture recognition, state machines, and parsers to create an even richer human/machine tactile interface system capable of incorporating syntax and grammars.

Figure 27A:
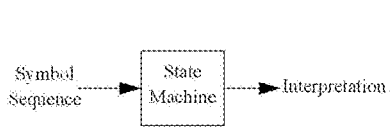
FIGS. 27a-27d depict operations acting on various parameters, rates, and symbols to produce other parameters, rates, and symbols, including operations such as sample/hold, interpretation, context, etc.
Figure 27B:
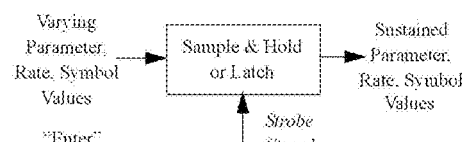
Figure 27C:
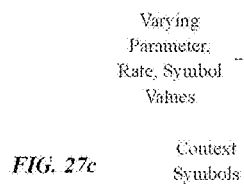
Figure 27D:
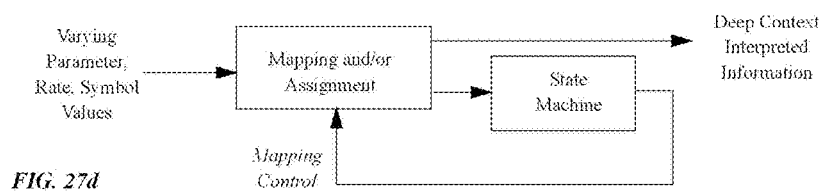

The HDTP affords and provides for yet further capabilities. For example, sequence of symbols can be directed to a state machine, as shown in FIG. 27*a* (adapted from U.S. patent application Ser. No. 12/418,605 and described in U.S. Pat. No. 6,570,078), to produce other symbols that serve as interpretations of one or more possible symbol sequences. In an embodiment, one or more symbols can be designated the meaning of an "Enter" key, permitting for sampling one or more varying parameter, rate, and symbol values and holding the value(s) until, for example, another "Enter" event, thus producing sustained values as illustrated in FIG. 27*b* (adapted from U.S. patent application Ser. No. 12/418,605 and described in U.S. Pat. No. 6,570,078). In an embodiment, one or more symbols can be designated as setting a context for interpretation or operation and thus control mapping or assignment operations on parameter, rate, and symbol values as shown in FIG. 27*c* (adapted from U.S. patent application Ser. No. 12/418,605 and described in U.S. Pat. No. 6,570,078). The operations associated with FIGS. 27*a*-27*c* can be combined to provide yet other capabilities. For example, the arrangement of FIG. 26*d* shows mapping or assignment operations that feed an interpretation state machine which in turn controls mapping or assignment operations. In implementations where context is involved, such as in arrangements such as those depicted in FIGS. 27*b*-27*d*, the invention provides for both context-oriented and context-free production of parameter, rate, and symbol values. The parallel production of context-oriented and context-free values can be useful to drive multiple applications simultaneously, for data recording, diagnostics, user feedback, and a wide range of other uses.

Figure 28:
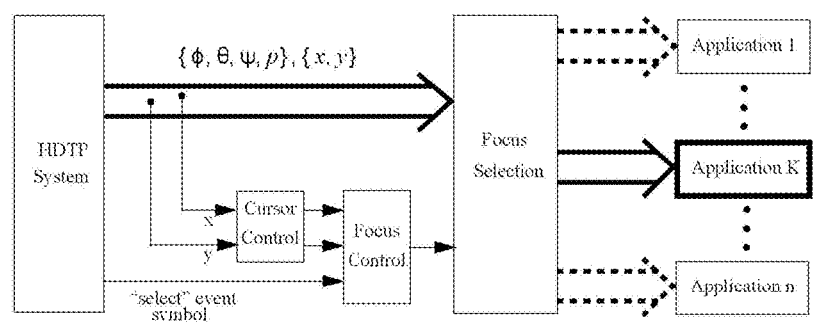
FIG. 28 depicts a user interface input arrangement incorporating one or more HDTPs that provides user interface input event and quantity routing.

FIG. 28 (adapted from U.S. patent applications Ser. Nos. 12/502,230 and 13/026,097) depicts a user arrangement incorporating one or more HDTP system(s) or subsystem(s) that provide(s) user interface input event and routing of HDTP produced parameter values, rate values, symbols, etc. to a variety of applications. In an embodiment, these parameter values, rate values, symbols, etc. can be produced for example by utilizing one or more of the individual systems, individual methods, and individual signals described above in conjunction with the discussion of FIGS. 25, 26, and 27*a*-27*b*. As discussed later, such an approach can be used with other rich multiparameter user interface devices in place of the HDTP. The arrangement of FIG. 27 is taught in pending U.S. patent application Ser. No. 12/502,230 "Control of Computer Window Systems, Computer Applications, and Web Applications via High Dimensional Touchpad User Interface" and FIG. 28 is adapted from FIG. 6*e* of pending U.S. patent application Ser. No. 12/502,230 for use here. Some aspects of this (in the sense of general workstation control) is anticipated in U.S. Pat. No. 6,570,078 and further aspects of this material are taught in pending U.S. patent application Ser. No. 13/026,097 "Window Manger Input Focus Control for High Dimensional Touchpad (HDTP), Advanced Mice, and Other Multidimensional User Interfaces."

In an arrangement such as the one of FIG. 28, or in other implementations, at least two parameters are used for navigation of the cursor when the overall interactive user interface system is in a mode recognizing input from cursor control. These can be, for example, the left-right ("x") parameter and forward/back ("y") parameter provided by the touchpad. The arrangement of FIG. 28 includes an implementation of this.

Alternatively, these two cursor-control parameters can be provided by another user interface device, for example another touchpad or a separate or attached mouse.

In some situations, control of the cursor location can be implemented by more complex means. One example of this would be the control of location of a 3D cursor wherein a third parameter must be employed to specify the depth coordinate of the cursor location. For these situations, the arrangement of FIG. 28 would be modified to include a third parameter (for use in specifying this depth coordinate) in addition to the left-right ("x") parameter and forward/back ("y") parameter described earlier.

Focus control is used to interactively routing user interface signals among applications. In most current systems, there is at least some modality wherein the focus is determined by either the current cursor location or a previous cursor location when a selection event was made. In the user experience, this selection event typically involves the user interface providing an event symbol of some type (for example a mouse click, mouse double-click touchpad tap, touchpad double-tap, etc). The arrangement of FIG. 28 includes an implementation wherein a select event generated by the touchpad system is directed to the focus control element. The focus control element in this arrangement in turn controls a focus selection element that directs all or some of the broader information stream from the HDTP system to the currently selected application. (In FIG. 28, "Application K" has been selected as indicated by the thick-lined box and information-flow arrows.)

In some embodiments, each application that is a candidate for focus selection provides a window displayed at least in part on the screen, or provides a window that can be deiconified from an icon tray or retrieved from beneath other windows that can be obfuscating it. In some embodiments, if the background window is selected, focus selection element that directs all or some of the broader information stream from the HDTP system to the operating system, window system, and features of the background window. In some embodiments, the background window can be in fact regarded as merely one of the applications shown in the right portion of the arrangement of FIG. 28. In other embodiments, the background window can be in fact regarded as being separate from the applications shown in the right portion of the arrangement of FIG. 28. In this case the routing of the broader information stream from the HDTP system to the operating system, window system, and features of the background window is not explicitly shown in FIG. 28.

Use of the Additional HDTP Parameters by Applications

The types of human-machine geometric interaction between the hand and the HDTP facilitate many useful applications within a visualization environment. A few of these include control of visualization observation viewpoint location, orientation of the visualization, and controlling fixed or selectable ensembles of one or more of viewing parameters, visualization rendering parameters, pre-visualization operations parameters, data selection parameters, simulation control parameters, etc. As one example, the 6D orientation of a finger can be naturally associated with visualization observation viewpoint location and orientation, location and orientation of the visualization graphics, etc. As another example, the 6D orientation of a finger can be naturally associated with a vector field orientation for introducing synthetic measurements in a numerical simulation.

As yet another example, at least some aspects of the 6D orientation of a finger can be naturally associated with the orientation of a robotically positioned sensor providing actual measurement data. As another example, the 6D orientation of a finger can be naturally associated with an object location and orientation in a numerical simulation. As another example, the large number of interactive parameters can be abstractly associated with viewing parameters, visualization rendering parameters, pre-visualization operations parameters, data selection parameters, numeric simulation control parameters, etc.

In yet another example, the x and y parameters provided by the HDTP can be used for focus selection and the remaining parameters can be used to control parameters within a selected GUI.

In still another example, the x and y parameters provided by the HDTP can be regarded as a specifying a position within an underlying base plane and the roll and pitch angles can be regarded as a specifying a position within a superimposed parallel plane. In a first extension of the previous two-plane example, the yaw angle can be regarded as the rotational angle between the base and superimposed planes. In a second extension of the previous two-plane example, the finger pressure can be employed to determine the distance between the base and superimposed planes. In a variation of the previous two-plane example, the base and superimposed plane can not be fixed as parallel but rather intersect as an angle associated with the yaw angle of the finger. In the each of these, either or both of the two planes can represent an index or indexed data, a position, pair of parameters, etc. of a viewing aspect, visualization rendering aspect, pre-visualization operations, data selection, numeric simulation control, etc.

A large number of additional approaches are possible as is appreciated by one skilled in the art. These are provided for by the invention.

Support for Additional Parameters via Browser Plug-ins

The additional interactively-controlled parameters provided by the HDTP provide more than the usual number supported by conventional browser systems and browser networking environments. This can be addressed in a number of ways. The following examples of HDTP arrangements for use with browsers and servers are taught in pending U.S. patent application Ser. No. 12/875,119 entitled "Data Visualization Environment with Dataflow Processing, Web, Collaboration, High-Dimensional User Interfaces, Spreadsheet Visualization, and Data Sonification Capabilities."

Figure 29A:
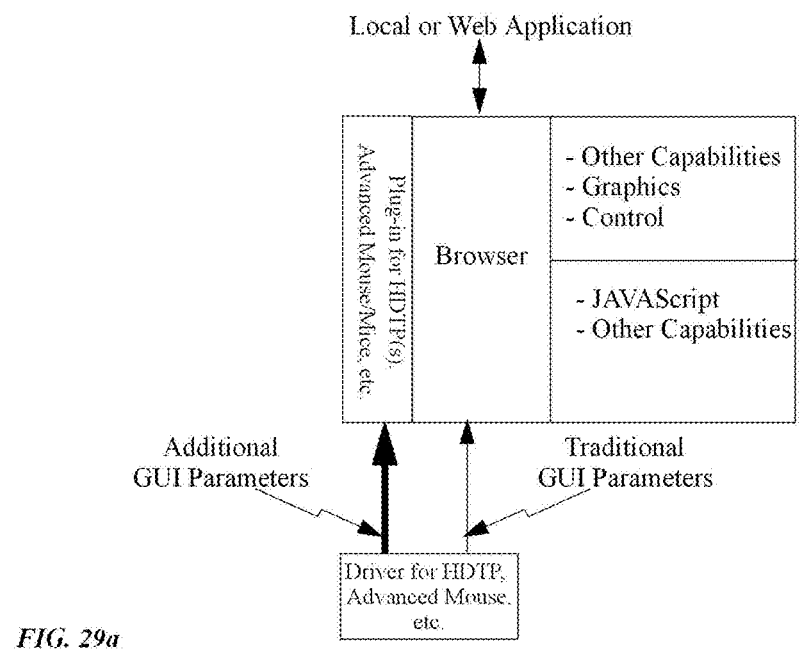
FIGS. 29a-29c depict methods for interfacing the HDTP with a browser.

In a first approach, an HDTP interfaces with a browser both in a traditional way and additionally via a browser plug-in. Such an arrangement can be used to capture the additional user interface input parameters and pass these on to an application interfacing to the browser. An example of such an arrangement is depicted in FIG. 29a.

Figure 29B:
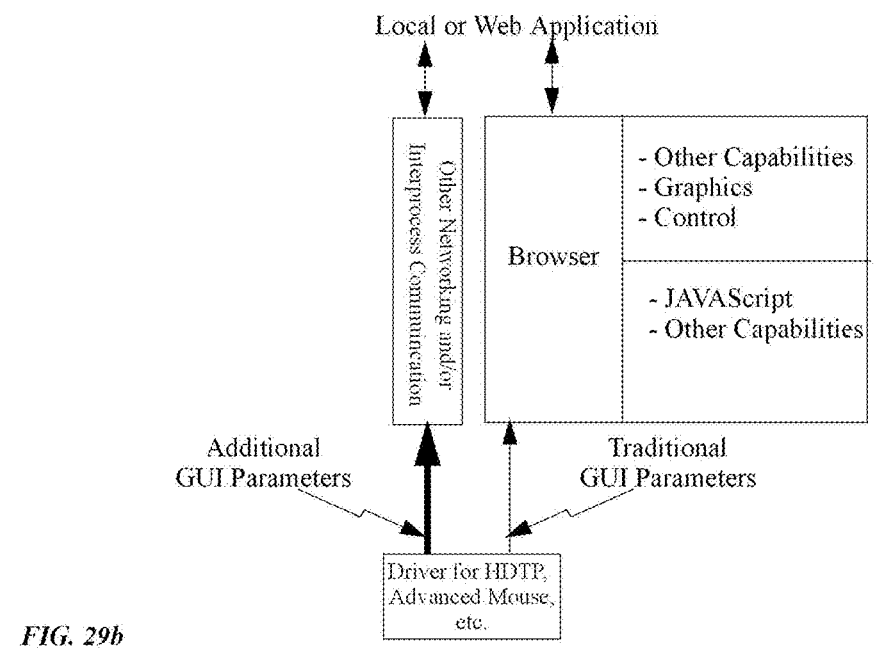

In a second approach, an HDTP interfaces with a browser in a traditional way and directs additional GUI parameters though other network channels. Such an arrangement can be used to capture the additional user interface input parameters and pass these on to an application interfacing to the browser. An example of such an arrangement is depicted in FIG. 29b.

Figure 29C:
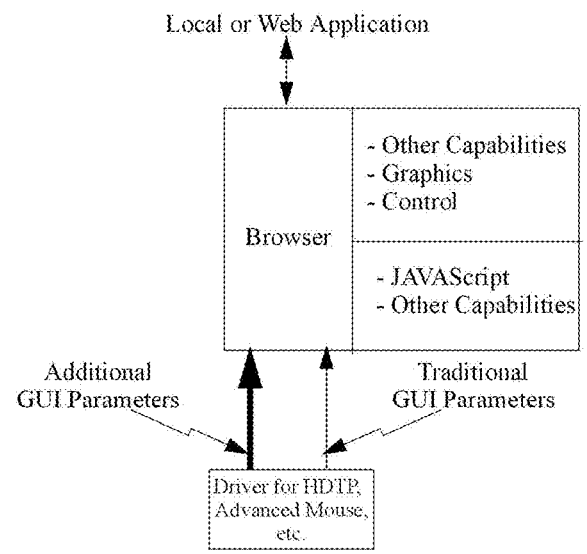

In a third approach, an HDTP interfaces all parameters to the browser directly. Such an arrangement can be used to capture the additional user interface input parameters and pass these on to an application interfacing to the browser. An example of such an arrangement is depicted in FIG. 29c.

The browser can interface with local or web-based applications that drive the visualization and control the data source(s), process the data, etc. The browser can be provided with client-side software such as JAVA Script or other alternatives. The browser can provide also be configured advanced graphics to be rendered within the browser display environment, allowing the browser to be used as a viewer for data visualizations, advanced animations, etc., leveraging the additional multiple parameter capabilities of the HDTP. The browser can interface with local or web-based applications that drive the advanced graphics. In an embodiment, the browser can be provided with Simple Vector Graphics ("SVG") utilities (natively or via an SVG plug-in) so as to render basic 2D vector and raster graphics. In another embodiment, the browser can be provided with a 3D graphics capability, for example via the Cortona 3D browser plug-in.

Multiple Parameter Extensions to Traditional Hypermedia Objects

As taught in pending U.S. patent application Ser. No. 13/026,248 "Enhanced Roll-Over, Button, Menu, Slider, and Hyperlink Environments for High Dimensional Touchpad (HTPD), other Advanced Touch User Interfaces, and Advanced Mice", the HDTP can be used to provide extensions to the traditional and contemporary hyperlink, roll-over, button, menu, and slider functions found in web browsers and hypermedia documents leveraging additional user interface parameter signals provided by an HTPD. Such extensions can include, for example:

In the case of a hyperlink, button, slider and some menu features, directing additional user input into a hypermedia "hotspot" by clicking on it;

In the case of a roll-over and other menu features: directing additional user input into a hypermedia "hotspot" simply from cursor overlay or proximity (i.e., without clicking on it);

The resulting extensions will be called "Multiparameter Hypermedia Objects" ("MHO").

Potential uses of the MHOs and more generally extensions provided for by the invention include:

Using the additional user input to facilitate a rapid and more detailed information gathering experience in a low-barrier sub-session;

Potentially capturing notes from the sub-session for future use;

Potentially allowing the sub-session to retain state (such as last image displayed);

Leaving the hypermedia "hotspot" without clicking out of it.

A number of user interface metaphors can be employed in the invention and its use, including one or more of:

Creating a pop-up visual or other visual change responsive to the rollover or hyperlink activation;

Rotating an object using rotation angle metaphors provided by the APD;

Rotating a user-experience observational viewpoint using rotation angle metaphors provided by the APD, for example, as described in pending U.S. patent application Ser. No. 12/502,230 "Control of Computer Window Systems, Computer Applications, and Web Applications via High Dimensional Touchpad User Interface" by Seung Lim;

Navigating at least one (1-dimensional) menu, (2-dimensional) pallet or hierarchical menu, or (3-dimensional) space.

These extensions, features, and other aspects of the present invention permit far faster browsing, shopping, information gleaning through the enhanced features of these extended functionality roll-over and hyperlink objects.

In addition to MHOs that are additional-parameter extensions of traditional hypermedia objects, new types of MHOs unlike traditional or contemporary hypermedia objects can be implemented leveraging the additional user interface parameter signals and user interface metaphors that can be associated with them. Illustrative examples include:

Visual joystick (can keep position after release, or return to central position after release);

Visual rocker-button (can keep position after release, or return to central position after release);

Visual rotating trackball, cube, or other object (can keep position after release, or return to central position after release);

A small miniature touchpad).

Yet other types of MHOs are possible and provided for by the invention. For example:

The background of the body page can be configured as an MHO;

The background of a frame or isolated section within a body page can be configured as an MHO;

An arbitrarily-shaped region, such as the boundary of an entity on a map, within a photograph, or within a graphic can be configured as an MHO.

In any of these, the invention provides for the MHO to be activated or selected by various means, for example by clicking or tapping when the cursor is displayed within the area, simply having the cursor displayed in the area (i.e., without clicking or tapping, as in rollover), etc.

It is anticipated that variations on any of these and as well as other new types of MHOs can similarly be crafted by those skilled in the art and these are provided for by the invention.

User Training

Since there is a great deal of variation from person to person, it is useful to include a way to train the invention to the particulars of an individual's hand and hand motions. For example, in a computer-based application, a measurement training procedure will prompt a user to move their finger around within a number of different positions while it records the shapes, patterns, or data derived from it for later use specifically for that user.

Figure 30A:
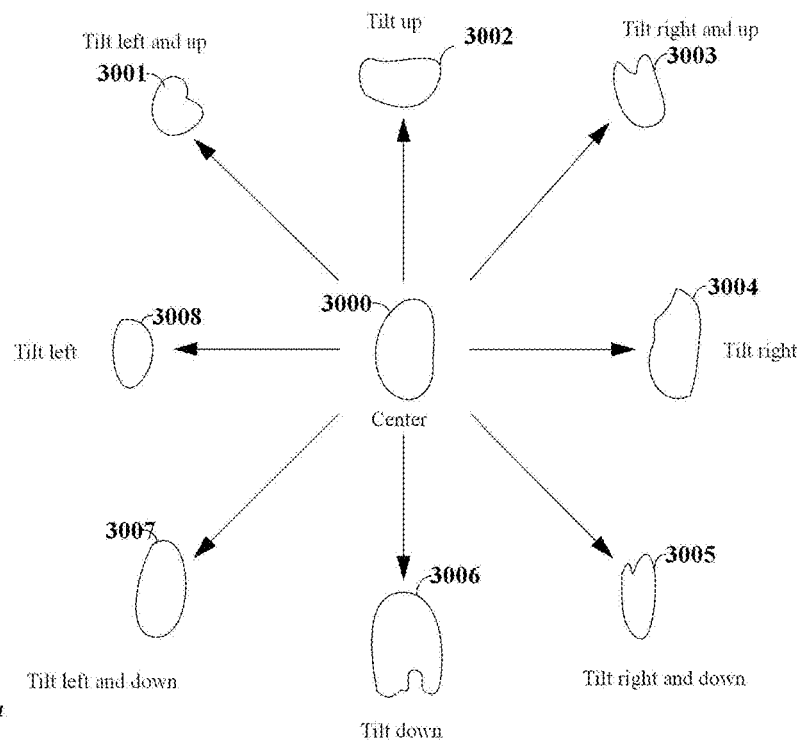
FIG. 30a depicts a user-measurement training procedure wherein a user is prompted to touch the tactile sensor array in a number of different positions.
Figure 30B:
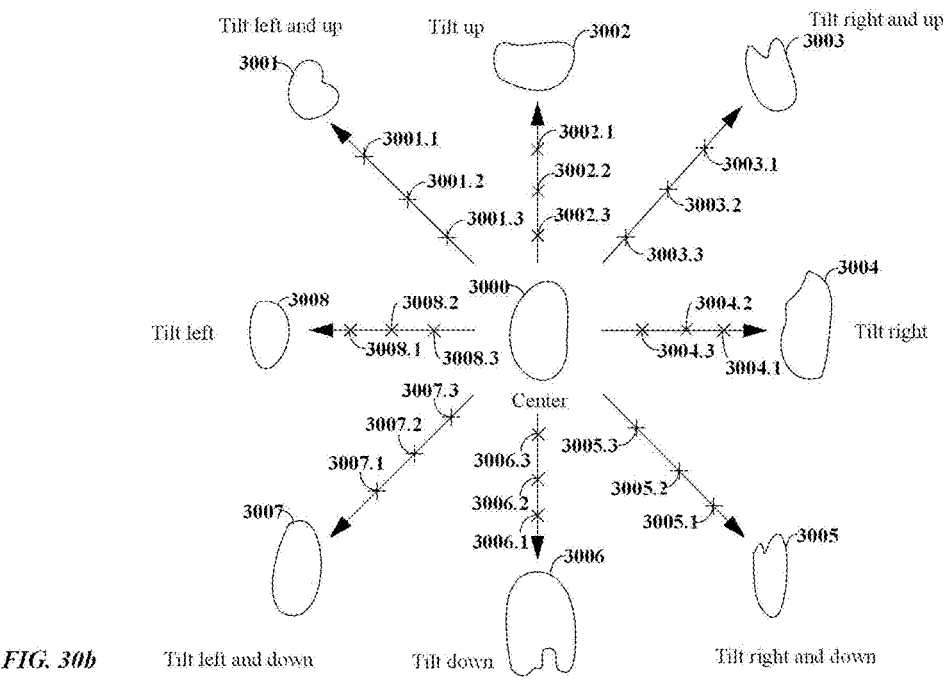
FIG. 30b depicts additional postures for use in a measurement training procedure for embodiments or cases wherein a particular user does not provide sufficient variation in image shape the training.
Figure 30C:
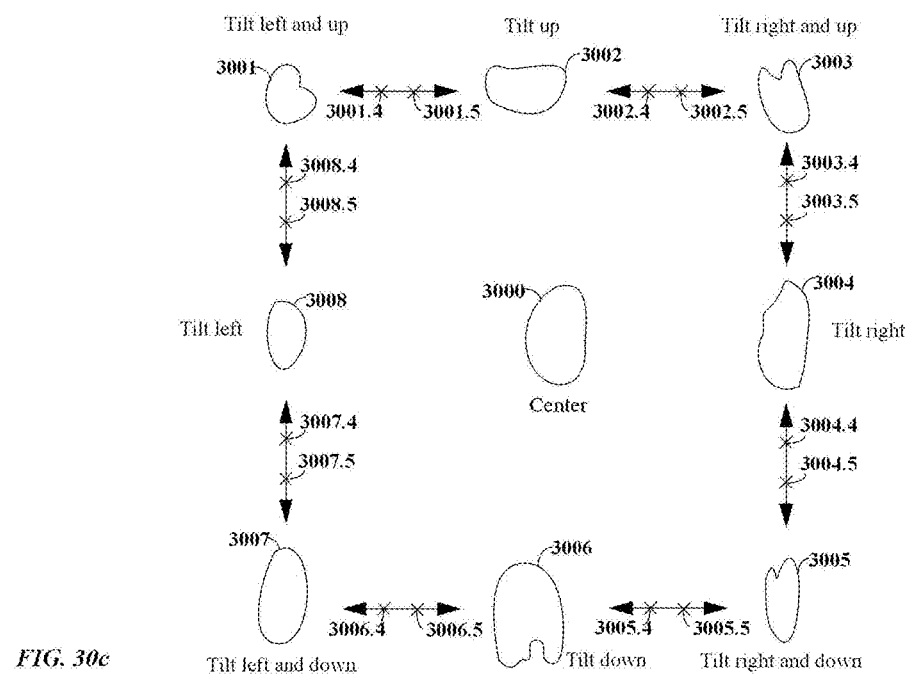
FIG. 30c depicts boundary-tracing trajectories for use in a measurement training procedure.

Typically most finger postures make a distinctive pattern. In one embodiment, a user-measurement training procedure could involve having the user prompted to touch the tactile sensor array in a number of different positions, for example as depicted in FIG. 30a (adapted from U.S. patent application Ser. No. 12/418,605). In some embodiments only representative extreme positions are recorded, such as the nine postures 3000-3008. In yet other embodiments, or cases wherein a particular user does not provide sufficient variation in image shape, additional postures can be included in the measurement training procedure, for example as depicted in FIG. 30b (adapted from U.S. patent application Ser. No. 12/418,605). In some embodiments, trajectories of hand motion as hand contact postures are changed can be recorded as part of the measurement training procedure, for example the eight radial trajectories as depicted in FIGS. 30a-30b, the boundary-tracing trajectories of FIG. 30c (adapted from U.S. patent application Ser. No. 12/418,605), as well as others that would be clear to one skilled in the art. All these are provided for by the invention.

The range in motion of the finger that can be measured by the sensor can subsequently be re-corded in at least two ways. It can either be done with a timer, where the computer will prompt user to move his finger from position 3000 to position 3001, and the tactile image imprinted by the finger will be recorded at points 3001.3, 3001.2 and 3001.1. Another way would be for the computer to query user to tilt their finger a portion of the way, for example "Tilt your finger ⅔ of the full range" and record that imprint. Other methods are clear to one skilled in the art and are provided for by the invention.

Additionally, this training procedure allows other types of shapes and hand postures to be trained into the system as well. This capability expands the range of contact possibilities and applications considerably. For example, people with physical handicaps can more readily adapt the system to their particular abilities and needs.

Figure 31:
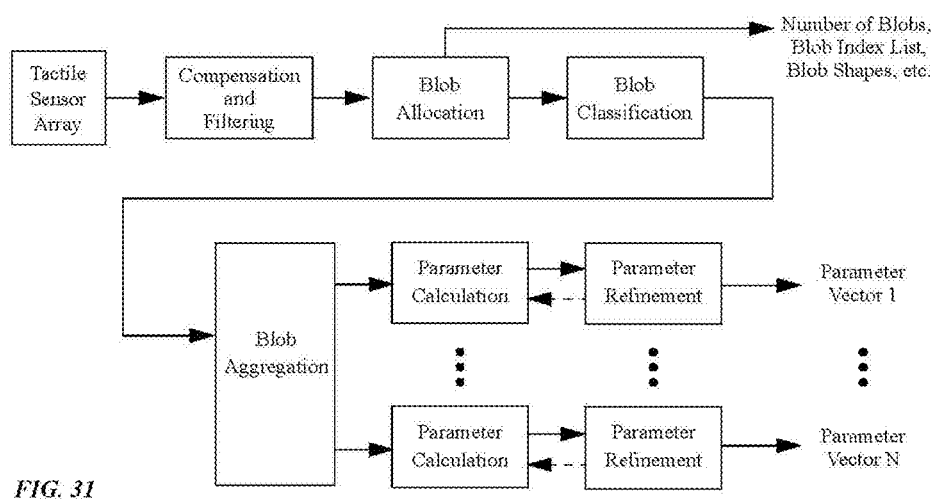
FIG. 31 depicts an HDTP signal flow chain for an HDTP realization implementing multi-touch, shape and constellation (compound shape) recognition, and other features.

FIG. 31 depicts a HDTP signal flow chain for an HDTP realization that can be used, for example, to implement multi-touch, shape and constellation (compound shape) recognition, and other HDTP features. After processing steps that can for example, comprise one or more of blob allocation, blob classification, and blob aggregation (these not necessarily in the order and arrangement depicted in FIG. 31), the data record for each resulting blob is processed so as to calculate and refine various parameters (these not necessarily in the order and arrangement depicted in FIG. 31).

For example, a blob allocation step can assign a data record for each contiguous blob found in a scan or other processing of the pressure, proximity, or optical image data obtained in a scan, frame, or snapshot of pressure, proximity, or optical data measured by a pressure, proximity, or optical tactile sensor array or other form of sensor. This data can be previously preprocessed (for example, using one or more of compensation, filtering, thresholding, and other operations) as shown in the figure, or can be presented directly from the sensor array or other form of sensor. In some implementations, operations such as compensation, thresholding, and filtering can be implemented as part of such a blob allocation step. In some implementations, the blob allocation step provides one or more of a data record for each blob comprising a plurality of running sum quantities derived from blob measurements, the number of blobs, a list of blob indices, shape information about blobs, the list of sensor element addresses in the blob, actual measurement values for the relevant sensor elements, and other information.

A blob classification step can include for example shape information and can also include information regarding individual noncontiguous blobs that can or should be merged (for example, blobs representing separate segments of a finger, blobs representing two or more fingers or parts of the hand that are in at least a particular instance are to be treated as a common blob or otherwise to be associated with one another, blobs representing separate portions of a hand, etc.).

A blob aggregation step can include any resultant aggregation operations including, for example, the association or merging of blob records, associated calculations, etc. Ultimately a final collection of blob records are produced and applied to calculation and refinement steps used to produce user interface parameter vectors. The elements of such user interface parameter vectors can comprise values responsive to one or more of forward-back position, left-right position, downward pressure, roll angle, pitch angle, yaw angle, etc from the associated region of hand input and can also comprise other parameters including rates of change of there or other parameters, spread of fingers, pressure differences or proximity differences among fingers, etc. Additionally there can be interactions between refinement stages and calculation stages, reflecting, for example, the kinds of operations described earlier in conjunction with FIGS. 23, 24a, and 24b.

The resulting parameter vectors can be provided to applications, mappings to applications, window systems, operating systems, as well as to further HDTP processing. For example, the resulting parameter vectors can be further processed to obtain symbols, provide additional mappings, etc. In this arrangement, depending on the number of points of contact and how they are interpreted and grouped, one or more shapes and constellations can be identified, counted, and listed, and one or more associated parameter vectors can be produced. The parameter vectors can comprise, for example, one or more of forward-back, left-right, downward pressure, roll, pitch, and yaw associated with a point of contact. In the case of a constellation, for example, other types of data can be in the parameter vector, for example inter-fingertip separation differences, differential pressures, etc.

Fitting Curves to Tactile Image Feature Edges for use in HDTP Parameter Calculations The invention provides for fitting curves to tactile image feature edges for use in user interface systems, including use in calculation for HDTP user interface input ("user interface parameter") values, gesture recognition, support of artificial neural network operations, implementation of heuristics, etc.

Figure 32:
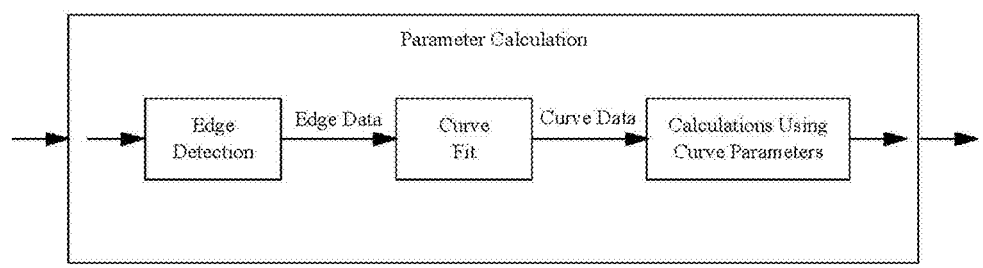
FIG. 32 depicts the incorporation of edge detection, curve-fitting, and calculations operating on curve parameters from the fitted curves as components within "Parameter Calculation" entities (or their equivalents in other embodiments and architectures).

In an example implementation, boundary edges of contiguous blobs within a provided tactile image frame are detected (for example, employing techniques such as those of Canny and its variants, numerical differential and related techniques of Roberts, Sobel, Prewitt, or those of others), and the edge information is presented, in some cases after pre-processing (for example, partitioning into halves, rotations to correct for yaw, axes-exchange to prevent multi-valued function issues, etc.) to one or more curve-fitting operations (for example employing polynomial regression, superellipse fitting, generalized Hough transform, or others). In some implementations the curve-fitting operation(s) can provide geometric information (for example positions, sizes, eccentricities, curvatures, etc. of circles, ellipses, splines, or other curves). In some implementations the curve-fitting operation(s) can provide more abstract information (for example, the coefficients of one or more terms of a fitted polynomial curve). The resulting information can then be used in calculations of user interface input ("user interface parameter") values, gesture recognition, support of artificial neural network operations, implementation of heuristics, etc. FIG. 32 depicts the incorporation of edge detection, curve-fitting, and calculations operating on curve parameters from the fitted curves as components within "Parameter Calculation" entities such as those depicted in FIG. 31 (or their equivalents in other embodiments and architectures).

Figure 33A:
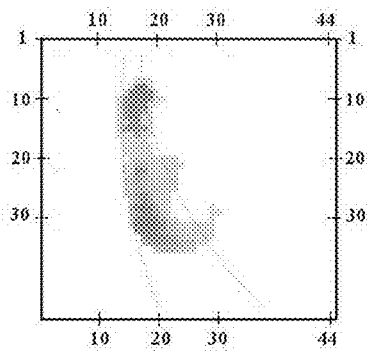
FIGS. 33a-33b depict pressure or proximity images the first few steps of a roll motion as measured by a noisy and uncalibrated tactile sensor array as the finger begins rolling from a counterclockwise extreme towards a centered rest position.
Figure 33B:
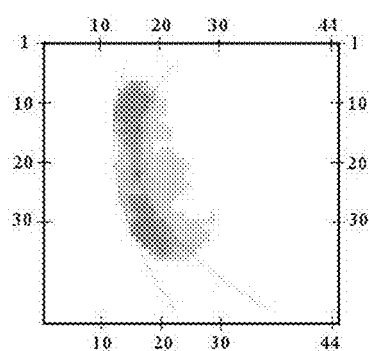
Figure 34A:
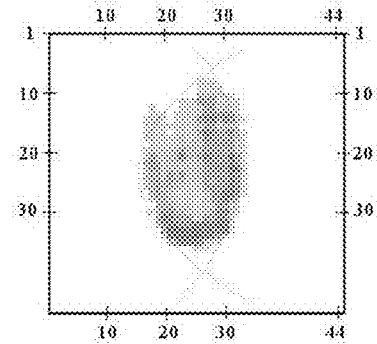
FIGS. 34a-34c depict pressure or proximity images progressive steps of the role motion in the angular neighborhood of a centered rest position.
Figure 34B:
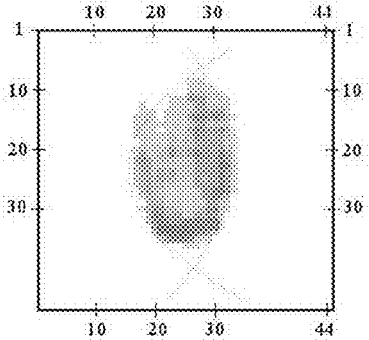
Figure 34C:
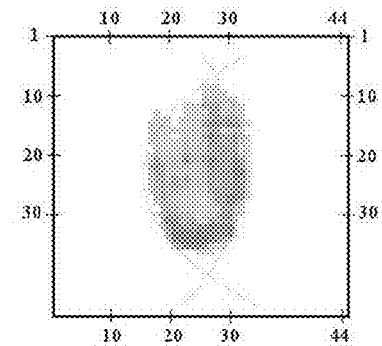
Figure 35:
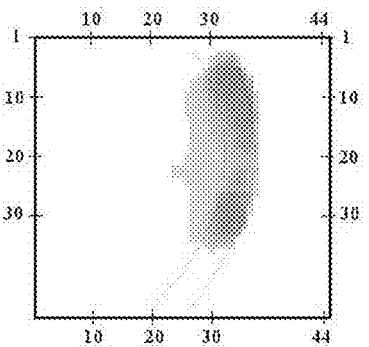
FIG. 35 depicts a pressure or proximity image the as the finger begins rolls into a clockwise extreme from the centered rest position.

In HDTP systems, the curve-fitting approach can be particularly useful in the real-time determination of finger roll angles and pitch angles from real-time measured tactile image data from a touch sensor such as a capacitive matrix, pressure sensor array, LED array, video camera, arrays of on-off contact sensors, etc. As an example, the measurement of the roll angle of a fingertip in contact with a touch sensor is considered. FIGS. 33a-33b depict pressure or proximity image data from a touch sensor in the first few steps of a roll motion. More specifically, the depicted example measurements in these figures comprise noisy (and uncalibrated) data from a tactile sensor array as the finger begins rolling from a counterclockwise extreme towards a centered rest position. Similarly, FIGS. 34a-34c depict pressure or proximity image data in progressive steps of the roll motion in the angular neighborhood of a centered rest position, and FIG. 35 depicts a pressure or proximity image the as the finger begins rolls into a clockwise extreme from the centered rest position. In these figures, the shades depict associated ranges of measured pressure or proximity value. In each figure, a pair of parameterized curves have been fitted to the edges of the image threshold boundaries. These parameterized curves act on edge detection data (rather than the full data set), and parameters defining these curves (for example positions, sizes, eccentricities, curvatures, coefficients of one or more terms of a fitted polynomial curve, of circles, ellipses, parabolas, splines, or other curves) can be treated as measurement data from which HDTP parameters (in this case, roll angle) can be calculated.

In the following subsections of this section more detailed discussion is provided for these aspects of the invention.

Edge Detection

In an example implementation, boundary edges of contiguous blobs within a provided tactile image frame are detected (for example, employing threshold-crossing detection in the scan of the tactile measurement image, techniques such as those of Canny and its variants, numerical differential and related techniques of Roberts, Sobel, Prewitt, or those of others). The invention provides for edge detection to be used, for example, as a component within depicted "Parameter Calculation" entities as depicted in FIG. 32 (or their equivalents in other embodiments and architectures). Additionally or alternatively, edge detection can be used elsewhere in the information processing chain of the HDTP or other touch or video user interface system or algorithm.

In a simple implementation, sensor locations that are on the edges of blobs can be identified while scanning by their occurrence as the transition between measurement values below threshold and at or above threshold. For example, the first sensor location found when scanning left-to-right whose measurement exceeds the threshold value belongs to the left edge of a left-most blob encountered in the left-to-right sensor element scan. Similarly the subsequent first sensor location found whose measurement is less than the threshold value belongs to the right edge of a left-most blob encountered in the left-to-right sensor element scan. If there are other blobs encountered in the left-to-right scan, this pattern of first sensor locations found where the measurement makes a transition between values satisfying or less than a threshold value can be used to identify sensor locations that are on the edges of those blobs. The invention provides for approximating curves to be fit to these edges as discussed in the next subsection.

The data gradient boundaries edge-detection formalism can be viewed as a generalization of previous case where data gradient threshold is used as boundary, rather than first non-zero value. The invention provides for approximating curves to be fit to these edges as discussed in the next subsection. Data gradient boundary methods are well known in other applications—see for example J. Lian, L. Chen, K. Naik, Y. Liu, G. Agnew, "Gradient Boundary Detection for Time Series Snapshot Construction in Sensor Networks," IEEE Transactions on Parallel and Distributed Systems, October 2007 (vol. 18 no. 10), pp. 1462-1475.

Other related techniques provided for by the invention include use of the numerical differentiation and related operations of Roberts, Sobel, Prewitt. Embodiments of the invention provides for approximating curves to be fit to these edges as discussed in the next subsection.

Another technique provided for by the invention for edge detection examines sensor values for the entire tactile image frame, or at least regions in the neighborhood of what will be identified as a blob, and perform a coefficient-of-variation calculation on the collection of measurement values over the region. The outcome of the coefficient-of-variation can be used to set an adaptive threshold. Embodiments of the invention provides for approximating curves to be fit to these edges as discussed in the next subsection. Coefficient-of-variation techniques are well-known in statistical applications.

The invention also provides for the use of more sophisticated edge detection algorithms or approaches, for example Canny Edge Detection or other related methods. Canny Edge Detection has many variations but typically employs a Sobel operator to approximate gradient in vertical and horizontal directions, typically followed by non-maximum suppression and hysteresis thresholding operations. From the plurality of candidate edges identified by the non-maximum suppression and hysteresis thresholding operations, those candidate edges that are most extremely separated (for example, the leftmost and rightmost) are chosen using line scanning approach. The invention provides for approximating curves to be fit to these edges as discussed in the next subsection.

Applying Curve-Fitting Operations to Edge Data

The invention provides for curve-fitting operations to be used, for example, as a component within depicted "Parameter Calculation" entities as depicted in FIG. 32 (or their equivalents in other embodiments and architectures). Additionally or alternatively, curve-fitting operations can be used elsewhere in the information processing chain of the HDTP or other touch or video user interface system or algorithm.

In an implementation, edge information is presented, in some cases after pre-processing (for example, partitioning into halves, rotations to correct for yaw to prevent various interactions among desired measurements, subsequent axes-exchange to prevent multi-valued function issues, etc.) to one or more curve-fitting operations (for example employing polynomial regression, superellipse fitting, generalized Hough transform, or others). In some implementations the curve-fitting operation(s) can provide geometric information (for example positions, sizes, eccentricities, curvatures, etc. of circles, ellipses, splines, or other curves). In some implementations the curve-fitting operation(s) can provide more abstract information (for example, the coefficients of one or more terms of a fitted polynomial curve).

It should be noted that for curve fitting a yaw correction typically should be made before the curve fitting operation—otherwise the yaw angle can confuse the intended correlation between the fitted curves and other aspects of the finger position and motion (such as roll angle and pitch angle).

Polynomial Regression

The invention provides for polynomial regression to be used in curve-fitting. For example polynomial regression can be used to detect and express asymmetry in finger application to touch surface of a touch interface. Beginning with regarding that a finger is neutrally positioned about its roll-angle axis (i.e., with a roll angle of zero), variations in asymmetry exhibited by the finger rolled in one direction or another as captured in the measurements comprised by the pressure or proximity image frame would be expected to correlate well with parameters of its application. For example, a vertically-aligned finger (which can be viewed as having a yaw angle of zero) when rolled to the right will exhibit a measured tactile image asymmetry relative to vertical axis. Thus if the leftmost and right most edges are curve-fit with two respective parabolic curves, the coefficients of these parabolas could be used as metrics which could be analyzed analytically or interpreted via an artificial neural network (ANN). For example, each parabolic curve fit to an associated edge of the blob will exhibit a "direction" of concavity. The sign of the coefficient of the quadratic term of the function for parabolic curve reflects this direction of concavity (as can be confirmed by its role in the "Second Derivative Test" for concavity from introductory differential calculus). With some sensors, a finger placed in neutral position will exhibit near-symmetry and the quadratic coefficients of functions for the left and right parabolic curves fit to the blob edges will have opposite signs, while if the finger is rolled in one or another direction the signs will not differ and their agreed sign is indicative of the roll direction. With other sensors, as the finger is rolled, the sign of concavity for both curves stays the same, but their relative values change. The curve in direction of movement becomes more concave and another one become more straight.

Polynomial regression methods are well known in statistical applications and can be implemented in real-time with only slight computational load.

Deformable Superellipse Curve Fitting

As another example, the invention provides for the use of superellipses and deformable superellipses for curve fitting. Example teachings of the use of superellipses and deformable superellipses for curve fitting and algorithms for that can be found, for example, in:

M. Pilu, A. Fitzgibbon, R. Fisher, "Training PDMs on models: The Case of Deformable Superellipses," *Proceedings of the 7th British Machine Vision Conference*, Edinburgh, Scotland, 1996, $_{pp.}$ 373-382;

M. Osian, T. Tuytelaars, L. Van Gool, K. Leuven, "Fitting Superellipses to Incomplete Contours," IEEE Computer Society Conference on Computer Vision and Pattern Recognition Workshops (CVPRW '04), June 2004.

The coefficients of the superellipses and deformable superellipses can be used in a similar way to the afore described parabolic curves in obtaining important user interface parameters, for example the real-time determination of finger roll angles and pitch angles from real-time measured tactile image data from a touch sensor such as a capacitive matrix, pressure sensor array, LED array, video camera, arrays of on-off contact sensors, etc.

Generalized Hough Transform

The invention also provides for use of other sophisticated curve fitting techniques, such as for example the Generalized Hough Transform, for curve fitting. The Generalized Hough Transform in particular includes production of candidate edges (not unlike in the Canny technique) supplemented by a voting step.

Use of Curve-Fitting Results in Obtaining Tactile User Interface Output

The invention provides for information resulting from curve-fitting operations to be used, for example, in calculations of user interface input ("user interface parameter") values, for gesture recognition, to support of artificial neural network operations, in implementation of heuristics, and other uses. In HDTP systems, the curve-fitting approach can be particularly useful in the real-time determination of finger roll angles and pitch angles from real-time measured tactile image data from a touch sensor such as a capacitive matrix, pressure sensor array, arrays of on-off contact sensors, array, video camera, etc.

The invention provides for curve-fitting operations to be used, for example, as a component within depicted "Parameter Calculation" entities as depicted in FIG. 32 (or their equivalents in other embodiments and architectures). Additionally or alternatively, curve-fitting operations can be used elsewhere in the information processing chain of the HDTP or other touch or video user interface system or algorithm.

As an example, consider again the example described earlier wherein polynomial regression can be used to detect and express asymmetry in finger application to touch surface of a touch interface. If the leftmost and right most edges of a blob are curve-fit with two respective parabolic curves, the coefficients of these parabolas could be used as metrics which could be analyzed analytically or interpreted via an artificial neural network (ANN). For example, each parabolic curve fit to an associated edge of the blob will exhibit a "direction" of concavity. The sign of the coefficient of the quadratic term of the function for parabolic curve reflects this direction" of concavity. Accordingly, a finger placed in neutral position will exhibit near-symmetry and the quadratic coefficients of functions for the left and right parabolic curves fit to the blob edges will have opposite signs, while if the finger is rolled in one or another direction the signs will not differ and their agreed sign is indicative of the roll direction. For example, using the output from quadratic polynomial regression:

Roll(left-para)—left parabolic curve-fit coefficients for roll tracking (as taught in pending U.S. Patent Application 61/309,424)

Roll(right-para)—right parabolic curve-fit coefficients for roll tracking (as taught in pending U.S. Patent Application 61/309,424)

Roll(diff-para)—roll angle metric as determined by the difference between the coefficients of approximation parabolas (left/right for roll)

Pitch(upper-para)—upper parabolic curve-fit quadratic-term coefficients for pitch tracking (as taught in pending U.S. Patent Application 61/309,424)

Pitch(lower-para)—lower parabolic curve-fit quadratic-term coefficients for pitch tracking (as taught in pending U.S. Patent Application 61/309,424)

Pitch(diff-para)—pitch angle metric as determined by the difference between the coefficients of approximation parabolas (up/down)

Figure 36:
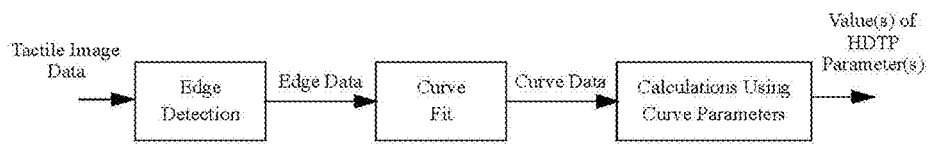
FIG. 36 depicts an embodiment wherein tactile image data is directed to a Canny Edge detection algorithm.

FIG. 36 depicts an embodiment wherein tactile image data is directed to a edge detection and curve-fitting operations. The curve parameters associated with the fitted curves are then passed to additional processing operations to produce the value(s) of one or more HDTP parameter(s).

Figure 37:
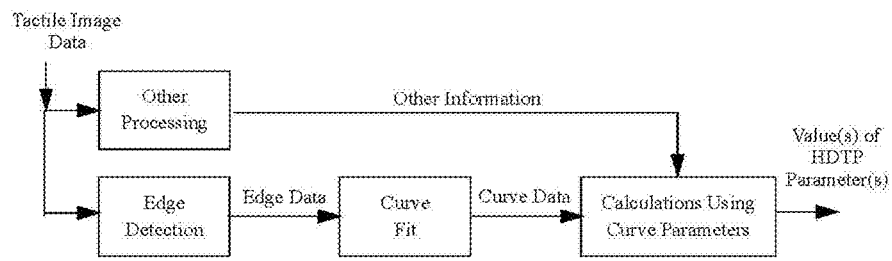
FIG. 37 depicts an alternate embodiment wherein the additional processing operations of additional processing operations such as those represented in FIG. 36 are supplemented by additional information, for example as can be obtained by other types of processing on the tactile image data.

FIG. 37 depicts an alternate embodiment wherein the additional processing operations of additional processing operations such as those represented in FIG. 36 are supplemented by additional information, for example as can be obtained by other types of processing on the tactile image data. For example, the additional processing operations can comprise the independent calculation of other HDTP parameters by means other than use of edge detection (averaging, eigenvector, etc., as described earlier) or other instances of edge detection processing.

Figure 38:
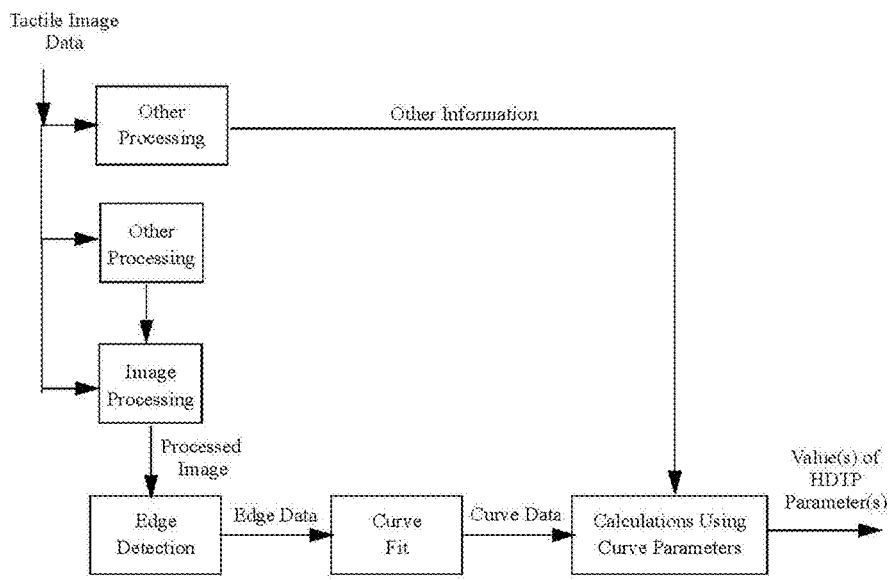
FIG. 38 depicts an alternate embodiment wherein the image is preprocessed according to information provided by analysis of the image data.

FIG. 38 depicts an alternate embodiment wherein the image is preprocessed according to information provided by analysis of the image data. For example, the other processing for image processing control can include:

Thresholding;

Median filtering;

Processing for to calculate parameters for filtering;

A calculated yaw angle (for example, using a closed-form expression as taught in pending U.S. patent application Ser. No. 12/724,413) is used to invoke a rotation algorithm to restore a reference position.

In particular, as noted earlier, a yaw correction typically should be made before the curve fitting operation as otherwise the yaw angle can confuse the intended correlation between the fitted curves and other aspects of the finger position and motion (such as roll angle and pitch angle). Thus in many implementations the arrangement of FIG. 38 or variations of it are desirable.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

I claim:

1. A system for implementing a touch user interface, the system comprising:
   a touch sensor providing tactile sensing data responsive to human touch made by a user to a touch surface disposed on the touch sensor;
   at least one processor for performing calculations on the tactile sensing data and from this producing processed sensor data;
   at least one edge detection algorithm for performing operations on the processed sensor data to produce edge data;
   at least one curve-fitting algorithm for performing operations on the edge data produced by the at least one edge detection algorithm to produce curve parameter data; and
   at least one calculation algorithm for performing operations on the curve parameter data to produce interpreted data,
   wherein the interpreted data comprises user interface information responsive to the human touch made by the user to the touch surface; and
   wherein the system is configured to be responsive to a touch-based gesture comprising a change in a roll angle of a finger.

2. The system of claim 1 wherein the touch sensor comprises a capacitive matrix.

3. The system of claim 1 wherein the touch sensor comprises a pressure sensor array.

4. The system of claim 1 wherein the touch sensor comprises a light emitting diode (LED) array.

5. The system of claim 1 wherein the touch sensor comprises a video camera.

6. The system of claim 1 wherein the at least one edge detection algorithm implements a Canny edge detection procedure.

7. The system of claim 1 wherein the at least one curve-fitting algorithm includes a polynomial regression.

8. The system of claim 1 wherein the at least one curve-fitting algorithm implements a superellipse curve fit.

9. The system of claim 1 wherein the interpreted data comprises a calculation of at least one numerical quantity whose value is responsive to the touch-based gesture made by the user.

10. The system of claim 1 wherein the system is further configured to be responsive to the touch-based gesture comprising a change in a pitch angle of the finger.

11. A method for implementing a touch user interface, the method comprising:
    receiving tactile sensing data from a touch surface disposed on a touch sensor, the touch sensor providing the tactile sensing data responsive to human touch made by a user to the touch surface;
    providing the tactile sensing data to at least one processor for performing calculations on the tactile sensing data;
    processing the tactile sensing data with the at least one processor to produce processed sensor data;
    providing the processed sensor data to at least one edge detection algorithm for performing operations on the processed sensor data to produce edge data;
    providing the edge data to at least one curve-fitting algorithm for performing operations on the edge data produced by the at least one edge detection algorithm to produce curve parameter data;
    providing the curve parameter data to at least one calculation algorithm for performing operations on the curve parameter data to produce interpreted data, and performing operations on the processed sensor data to produce interpreted data,
    wherein the interpreted data comprises user interface information responsive to the human touch made by the user to the touch surface, and
    wherein the touch-based gesture comprises a change in a roll angle of a finger.

12. The method of claim 11 wherein the touch sensor comprises a capacitive matrix.

13. The method of claim 11 wherein the touch sensor comprises a pressure sensor array.

14. The method of claim 11 wherein the touch sensor comprises a light emitting diode (LED) array.

15. The method of claim 11 wherein the touch sensor comprises a video camera.

16. The method of claim 11 wherein the at least one edge detection algorithm implements a Canny edge detection procedure.

17. The method of claim 11 wherein the at least one curve-fitting algorithm includes a polynomial regression.

18. The method of claim 11 wherein the at least one curve-fitting algorithm implements a superellipse curve fit.

19. The method of claim 11 wherein the interpreted data comprises a calculation of at least one numerical quantity whose value is responsive to the touch-based gesture made by the user.

20. The method of claim 11 wherein the method is further configured to be responsive to the touch-based gesture comprising a change in a pitch angle of the finger.

* * * * *